(12) United States Patent
Hilgers et al.

(10) Patent No.: US 12,515,717 B2
(45) Date of Patent: Jan. 6, 2026

(54) SYSTEM AND METHOD FOR GUIDANCE CONTROL ON A WHEELED BOGIE

(71) Applicant: DP WORLD LOGISTICS US HOLDINGS, INC., Auburn Hills, MI (US)

(72) Inventors: Andy Alexander Hilgers, Los Angeles, CA (US); Timothy Nicholas Leslie Lambert, Los Angeles, CA (US)

(73) Assignee: DP WORLD LOGISTICS US HOLDINGS, INC., Auburn Hills, MI (US)

( * ) Notice: Subject to any disclaimer, the term of this patent is extended or adjusted under 35 U.S.C. 154(b) by 767 days.

(21) Appl. No.: 17/790,752

(22) PCT Filed: Feb. 8, 2021

(86) PCT No.: PCT/US2021/017025
§ 371 (c)(1),
(2) Date: Jul. 4, 2022

(87) PCT Pub. No.: WO2021/162966
PCT Pub. Date: Aug. 19, 2021

(65) Prior Publication Data
US 2022/0379735 A1 Dec. 1, 2022

Related U.S. Application Data

(60) Provisional application No. 63/085,119, filed on Sep. 29, 2020, provisional application No. 63/050,751,
(Continued)

(51) Int. Cl.
*B60L 13/08* (2006.01)
*B61F 5/24* (2006.01)
(Continued)

(52) U.S. Cl.
CPC .......... *B61L 15/0072* (2013.01); *B60L 13/08* (2013.01); *B61F 5/245* (2013.01); *B61H 7/08* (2013.01);
(Continued)

(58) Field of Classification Search
CPC .. B61L 15/0058; B61L 15/0072; B61L 11/08; B61L 11/083; B61L 13/047;
(Continued)

(56) References Cited

U.S. PATENT DOCUMENTS 2,198,928 A 4/1940 Wehner
3,874,299 A 4/1975 Silva et al.
(Continued)

FOREIGN PATENT DOCUMENTS

DE 2541599 A1 3/1977
EP 3333043 A1 6/2018
(Continued)

OTHER PUBLICATIONS

Krull, Hintze, and Luke, "Eddycurrent Detection of Head Checks on the Gauge Corners of Rails: Recent Results" NDT.net, vol. 7, No. 6, Jun. 2002, entire document cited.
(Continued)

*Primary Examiner* — Christopher P Schwartz
(74) *Attorney, Agent, or Firm* — Seyfarth Shaw LLP

(57) ABSTRACT

A system and method for guidance control on a wheeled bogie is disclosed herein. An electromagnetic engine may be coupled to the wheeled bogie such that the electromagnetic engine may generate magnetically attractive forces between the electromagnetic engine and the rail. The generated force may be used to increase traction for braking and climbing operations. Further, the generated force may be used to counteract hunting oscillation. Still further, the generated
(Continued)

force may be used to counteract lift generated by the wheeled bogie operating in a turn with cant.

18 Claims, 32 Drawing Sheets

Related U.S. Application Data filed on Jul. 11, 2020, provisional application No. 63/028,551, filed on May 21, 2020, provisional application No. 62/978,293, filed on Feb. 18, 2020, provisional application No. 62/977,692, filed on Feb. 17, 2020, provisional application No. 62/976,128, filed on Feb. 13, 2020.

(51) Int. Cl.
*B61H 7/08* (2006.01)
*B61L 11/08* (2006.01)
*B61L 13/04* (2006.01)
*B61L 15/00* (2006.01)
*B61F 9/00* (2006.01)

(52) U.S. Cl.
CPC ............ *B61L 11/08* (2013.01); *B61L 11/083* (2013.01); *B61L 13/047* (2013.01); *B61L 15/0058* (2024.01); *B61L 15/0081* (2013.01); *B60L 2200/26* (2013.01); *B61F 9/005* (2013.01)

(58) Field of Classification Search
CPC .. B61L 15/0081; B60L 13/08; B60L 2200/26; B61F 5/242; B61F 9/005; B61H 7/08
USPC ..................... 188/156–165; 701/20
See application file for complete search history.

(56) References Cited

U.S. PATENT DOCUMENTS

| | | | |
|---|---|---|---|
| 3,911,829 A | 10/1975 | Ross et al. | |
| 3,941,062 A | 3/1976 | Machefert-Tassin | |
| 4,041,877 A | 8/1977 | Simon et al. | |
| 4,519,329 A | 5/1985 | Vacher | |
| 4,920,893 A | 5/1990 | Maupu | |
| 7,064,507 B2* | 6/2006 | Donnelly | B60L 3/102 |
| | | | 318/381 |
| 9,616,770 B2* | 4/2017 | Nogi | H02P 25/062 |
| 12,246,762 B2* | 3/2025 | Hilgers | B61C 15/04 |
| 12,291,249 B2* | 5/2025 | Hilgers | B61L 15/0058 |
| 2001/0035107 A1 | 11/2001 | Henderson | |
| 2007/0044676 A1 | 3/2007 | Clark et al. | |
| 2007/0173990 A1* | 7/2007 | Smith | B61L 3/127 |
| | | | 701/20 |
| 2014/0130700 A1* | 5/2014 | Lawrence | B61B 3/02 |
| | | | 104/89 |
| 2014/0246282 A1* | 9/2014 | Elstorpff | F16D 63/008 |
| | | | 188/165 |
| 2016/0009196 A1 | 1/2016 | Allard | |
| 2016/0144873 A1 | 5/2016 | Atmur et al. | |
| 2018/0186389 A1 | 7/2018 | Hosseini | |
| 2019/0031045 A1* | 1/2019 | Usman | F16C 32/0465 |
| 2022/0371635 A1* | 11/2022 | Hilgers | B61C 15/04 |

FOREIGN PATENT DOCUMENTS

| | | |
|---|---|---|
| GB | 1200201 A | 7/1970 |
| GB | 1494120 A | 12/1977 |
| GB | 2477109 A | 7/2011 |
| GB | 2477109 B | 2/2018 |
| KR | 20110036445 A | 4/2011 |
| WO | 2011152592 A1 | 12/2011 |

OTHER PUBLICATIONS

Liu et al., "Electromagnetic Tomography Rail Defect Inspection," IEEE Transactions of Magnetics, vol. 51, No. 10, dated Oct. 2015, retrieved online on May 17, 2021, entire document cited.
Ma et al., "Design and Analysis of the Hybrid Excitation Rail Eddy Brake System of High-Speed Trains" Journal of Zhejiang University, ISSN 1673-565X, dated Dec. 2011, Retrieved May 17, 2021, entire document cited.
Magel, Eric E. et al., A Practical Approach to Controlling Rolling Contact Fatigue in Railways, 2005, 8th International Heavy Haul Conference, entire document cited.
PCT IPEA/408 Written Opinion of International Preliminary Examining Authority, PCT/US2021/017025, dated Sept. 9, 2021, entire document cited.
PCT IPEA/408 Written Opinion of International Preliminary Examining Authority, PCT/US21/17029, dated Jul. 30, 2021, entire document cited.
PCT IPEA/408 Written Opinion of International Preliminary Examining Authority, PCT/US21/17032, dated Jul. 30, 2021, entire document cited.
PCT IPEA/409 International Preliminary Report on Patentability Chapter II, PCT/US2021/017025, dated May 13, 2022, entire document cited.
PCT IPEA/409 International Preliminary Report on Patentability Chapter II, PCT/US21/17029, dated May 12, 2022, entire document cited.
PCT IPEA/409 International Preliminary Report on Patentability Chapter II, PCT/US21/17032, dated May 31, 2022, entire document cited.
PCT ISA/210 International Search Report, PCT/US2021/017025, dated Jul. 14, 2021, entire document cited.
PCT ISA/210 International Search Report, PCT/US21/17029, dated Jul. 8, 2021, entire document cited.
PCT ISA/210 International Search Report, PCT/US21/17032, dated May 20, 2021, entire document cited.
PCT ISA/237 Written Opinion of International Searching Authority, PCT/US2021/017025, dated Jul. 14, 2021, entire document cited.
PCT ISA/237 Written Opinion of International Searching Authority, PCT/US21/17029, dated Jul. 8, 2021, entire document cited.
PCT ISA/237 Written Opinion of International Searching Authority, PCT/US21/17032, dated May 20, 2021, entire document cited.

* cited by examiner

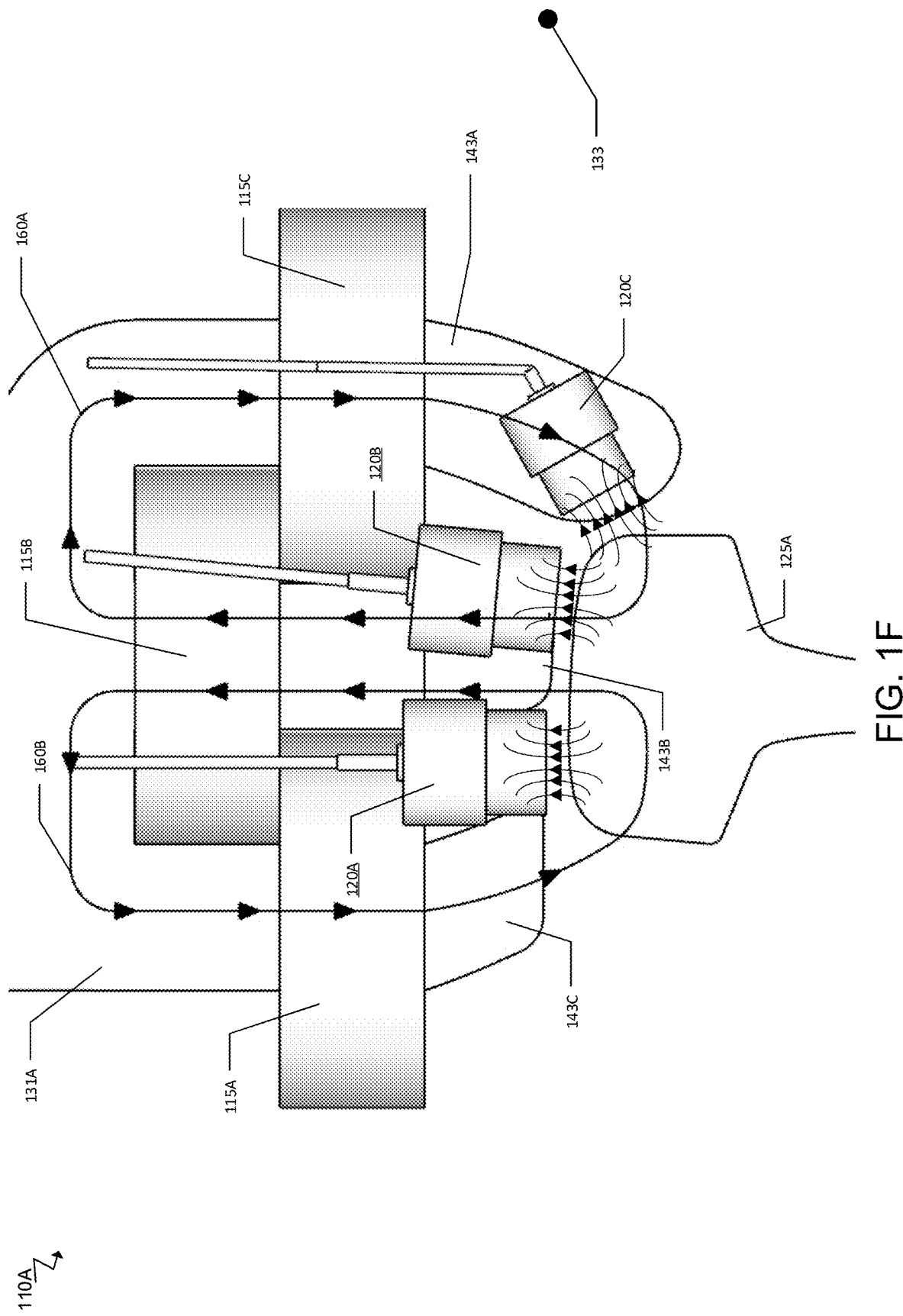

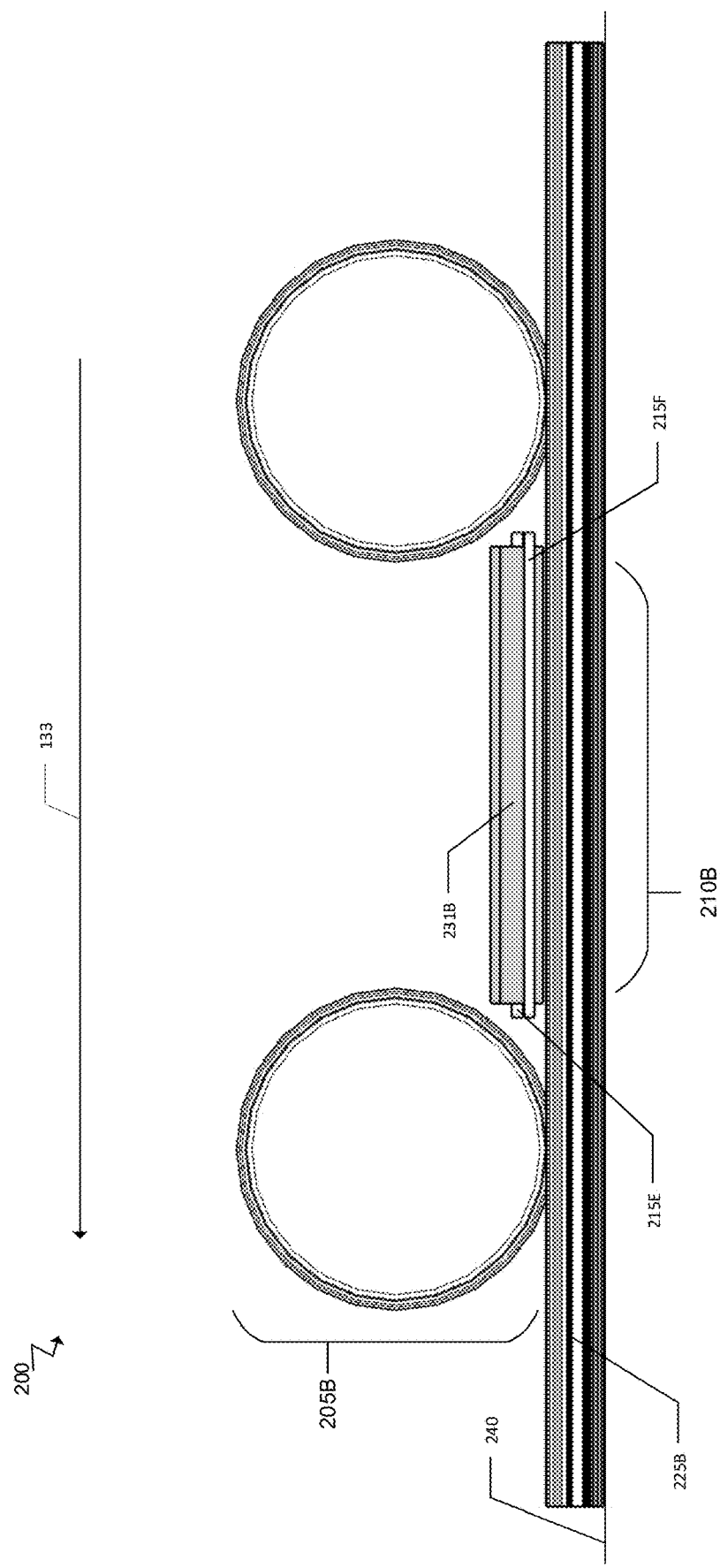

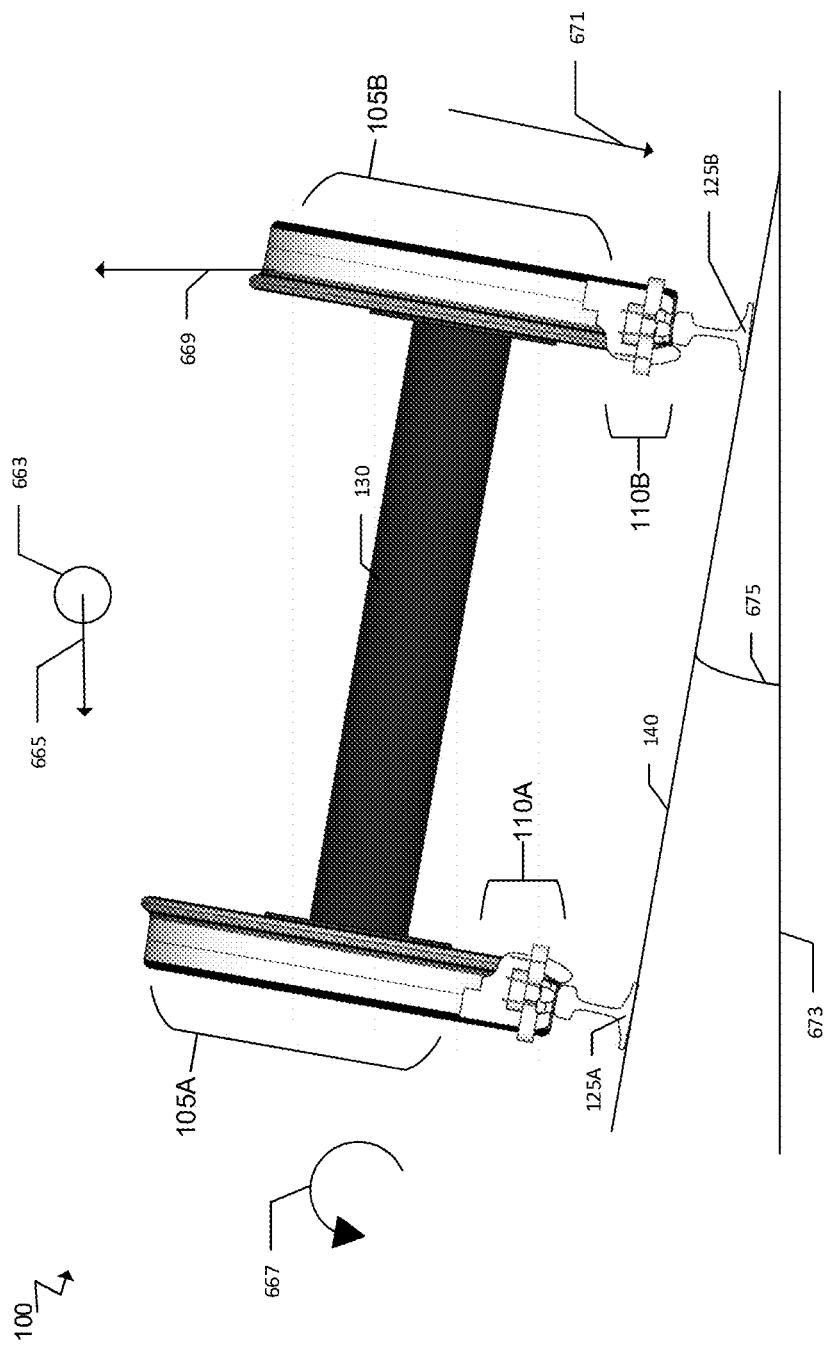

SYSTEM AND METHOD FOR GUIDANCE CONTROL ON A WHEELED BOGIE

CROSS REFERENCE AND PRIORITY TO RELATED APPLICATIONS

This application claims the benefit of priority under 35 USC 119(e) to: U.S. Provisional No. 62/976,128 entitled "Systems and Methods for Guidance Control on Wheeled Bogie," filed on Feb. 13, 2020; U.S. Provisional No. 62/977,692 entitled "Systems and Methods for Guidance Control on Non-Moving Switch," filed on Feb. 17, 2020; U.S. Provisional No. 62/978,293 entitled "Systems and Methods for Inverted Electromagnetic Engine on Wheeled Bogie," filed on Feb. 18, 2020; U.S. Provisional No. 63/028,551 "Systems and Methods for Real-time Track Monitoring," filed on May 21, 2020; U.S. Provisional No. 63/050,751 entitled "Systems and Methods for Rail Inspection Using Eddy Currents," filed on Jul. 11, 2020; U.S. Provisional No. 63/085,119 entitled "System and Method for a Treated Rail for Rolling Stock," filed on Sep. 29, 2020. Further, this application claims the benefit of priority under 35 USC 371 to PCT Application No. PCT/US21/17025 entitled "System and Method for Guidance Control on a Wheeled Bogie," filed on Feb. 8, 2021. All the aforementioned applications are hereby incorporated by reference in their entirety.

BACKGROUND

Existing railways are predominately utilized by conventional wheeled vehicles moving along metal rails. Derailment may cause property damage and even loss of life. Turnover on curves is one factor that contributes to derailment. Another cause of derailment is due to damage in the rail itself. Conical wheelsets have excellent low drag ratio. However, conical wheelsets cause significant wear on rails due to the metal-to-metal contact.

Rolling contact fatigue ("RCF") is a type of damage that occurs in metal rails due to overstressing of the rail materials. Damage may appear on the surface of the rail (e.g., head checks) or within the subsurface (e.g., a deep-seated shell). The largest contributor to overstressing the surface is the thousands to millions of intense, wheel-to-rail contacts during the operation of a bogie moving across the rails—seen, for example, on the outer rail when turning on curves.

After the Hatfield derailment in the United Kingdom during the year 2000, more safety authorities have been focusing on means to reduce RCF and its related dangers. According to the Federal Railway Administration of the United States, RCF was strongly implicated in 122 derailments between 1995 and 2002. In the European Union, RCF has been estimated to cost $2.8 billion per annum. Such figures are easy to reach when replacement of rail costs approximately $375,000 USD per track-mile (or per 1.61 track-km). With over 810,000 miles of track worldwide (1.3 million km of track worldwide), the economic effect is considerable.

What is needed is a method and a system to enable guidance control on a wheeled bogie operating in conventional railway systems. The system and method provide cost-effective solutions to, at least, the aforementioned problems related to safety and maintenance.

SUMMARY

An electromagnetic engine may be coupled to a wheeled bogie. The electromagnetic engine may comprise a steel core, the steel core having an outer prong, a center prong, and an inner prong. The electromagnetic engine may further comprise an outer coil, the outer coil being disposed about the outer prong, and an inner coil, the inner coil being disposed about the inner prong. In addition, the electromagnetic engine may have a controller operable to control the outer coil and the inner coil, or combination thereof.

In one aspect, the electromagnetic engine may have a center coil, the center coil being disposed about the center prong. The controller may further control the center coil. The electromagnetic engine may be configured with the outer coil and the inner coil being disposed below the center coil, where the center coil substantially overlaps with the outer coil and the inner coil. The outer coil, the center coil, and the inner coil may be disposed substantially in parallel along a horizontal line. The electromagnetic engine may be configured to provide control for a flangeless wheel assembly configured to traverse a rail having a rail extension. In one aspect, the inner prong is longer than the center prong and is configured to align with a profile of a flange belonging to a wheel assembly.

In one aspect, the electromagnetic engine may have a plurality of permanent magnets, where the permanent magnets are disposed below the center coil. The center coil may be disposed below the outer coil and the inner coil.

A wheel may be coupled to a wheeled bogie having an electromagnetic engine, the wheel may have a flange that forms a first diameter. The wheel may further have a conical section, where the conical section is disposed on the outboard side of the flange with respect to the first diameter. The conical section may form a second diameter that is less than the first diameter. Further the wheel may have a cylindrical section disposed on the outboard side of the conical section with respect to the second diameter. The cylindrical section may further have a third diameter. The wheel may have a shrinking diameter section, that may be disposed on the outboard side of the cylindrical section with respect to the third diameter. Further, the shrinking diameter section may form a fourth diameter, that is smaller than the third diameter.

An electromagnetic engine is disclosed and may be operable to be coupled to a wheeled bogie that is in turn operable to traverse a rail. The electromagnetic engine may have a plurality of coils, a memory, and a controller. The controller may determine a longitudinal grade of the rail. Further, the controller may determine a first value based on a loss of traction to the wheeled bogie once operating on the longitudinal grade, the first value being stored in the memory. The controller may further determine, based on the first value, a second value of attractive magnetic force between the electromagnetic engine and the rail, where the attractive magnetic force may be operable to mitigate the loss of traction. The second value may be stored in a memory. The controller may further excite the plurality of coils that are operable to attract the electromagnetic engine to the rail, and said exciting may be determined based on the second value.

A method is disclosed for operating an electromagnetic engine coupled to a wheeled bogie. The method determines a longitudinal grade of a rail. The method may then determine a first value based on a loss of traction between the rail and the wheeled bogie once operating on the longitudinal grade. Further, the method may determine based on a first value, a second value of attractive magnetic force between the electromagnetic engine and the rail. Such attractive magnetic force is operable to mitigate the loss of traction by the wheeled bogie. Still further, the method excites, at the electromagnetic engine, a plurality of coils operable to attract the electromagnetic engine to the rail. The intensity of the exciting may be based on the second value.

A plurality of electromagnetic engines may be operable to be coupled to a wheeled bogie operable to traverse a plurality of rails. The plurality of electromagnetic engines may have a plurality of coils respectively coupled to the plurality of electromagnetic engines. The plurality of electromagnetic engines may further have a memory, a first sensor, a second sensor, and a controller. The controller may detect, at the first sensor, a positive velocity of the wheeled bogie on the plurality of rails. Further, the controller may detect, at the second sensor, a first value, the first value may be based on the lateral movement of the wheeled bogie. In one aspect, the controller may store the first value in the memory. The controller may further determine, based on the first value, a plurality of operations to excite the plurality of coils that may be operable to apply attractive magnetic force between the electromagnetic engines and the plurality of rails. The lateral movement may be oscillation. In one aspect, such oscillation is hunting oscillation. The controller may be further operable to excite the plurality of coils according to the plurality of operations such that the lateral movement of the wheeled bogie is reduced.

Another method is disclosed for operating a plurality of electromagnetic engines coupled to a wheeled bogie. The method may detect, at a sensor, a positive velocity of the wheeled bogie on a plurality of rails. The method may store, in a memory, a first value based on the lateral movement of the wheeled bogie. The method may further determine, based on the first value, a plurality of operations to excite a plurality of coils respectively coupled to the plurality of electromagnetic engines. The plurality of coils may be operable to apply attractive magnetic force between the electromagnetic engine and the plurality of rails. The lateral movement may be oscillating. The method may be further operable to excite the plurality of coils according to the plurality of operations such that the lateral movement of the wheeled bogie is reduced.

A plurality of electromagnetic engines may be coupled to a wheeled bogie operable to traverse a first rail and a second rail. The plurality of electromagnetic engines may have a plurality of coils, that may be respectively coupled to the plurality of electromagnetic engines. The plurality of electromagnetic engines may have a first sensor, a second sensor, a memory, and a controller. The controller may detect, at the first sensor, the cant of the first rail and the second rail. The first rail may be disposed at a higher elevation than the second rail. The controller may further detect, at the second sensor, a first value based on the lift generated by the cant. The controller may store the first value in the memory. The controller may further determine a second value of attractive magnetic force to counteract the generated lift as stored in the first value. The controller may further store the second value in the memory. The controller may further excite, based on the second value, the plurality of coils. In one aspect, the plurality of coils may be operable to generate attractive magnetic force between the electromagnetic engines and the first rail, the second rail, or combination thereof.

Yet another method is disclosed for operating a plurality of electromagnetic engines coupled to a wheeled bogie. The method may detect, at a first sensor, the cant of a first rail and a second rail, where the first rail is disposed at a higher elevation than the second rail. The method may further detect, at a second sensor, a first value based on the lift generated by the cant. The method may yet further determine a second value of attractive magnetic force to counteract the generated lift stored in the first value. Still further, the method may excite, based on the second value, a plurality of coils that are coupled to the plurality of electromagnetic engines. The plurality of coils may be operable to generate attractive magnetic force between the electromagnetic engines and the first rail, the second rail, or combination thereof.

Any of the aforementioned methods may be stored as instructions in a computer-readable medium. The instructions, when executed by a computer, cause the computer to perform the methods.

A rail-based transportation system is disclosed. The system may have a wheeled bogie comprising a plurality of wheels with cylindrical profiles and an electromagnetic engine. The electromagnetic engine may have a plurality of coils that are disposed in a lateral direction. The system may further have a rail coupled to a rail extension. Said rail extension may be operable to provide an attractive surface for the plurality of coils configured to generate electromagnetic force to longitudinally guide a flangeless wheel having an electromagnetic engine. The plurality of coils may be disposed in a lateral direction.

BRIEF DESCRIPTION OF THE DRAWINGS

The accompanying drawings, which are incorporated herein and constitute part of this specification, illustrate exemplary aspects of the claims, and together with the general description given above and the detailed description given below, serve to explain the features of the claims.

FIG. 1F illustrates a planar view of an electromagnetic engine, as shown from a front perspective.

FIG. 2B illustrates a planar view of a wheeled bogie assembly, shown from a side perspective.

FIG. 7A illustrates a planar view of a bogie assembly operating on an inclined plane, as shown from a front perspective.

DETAILED DESCRIPTION

Figure 1A:
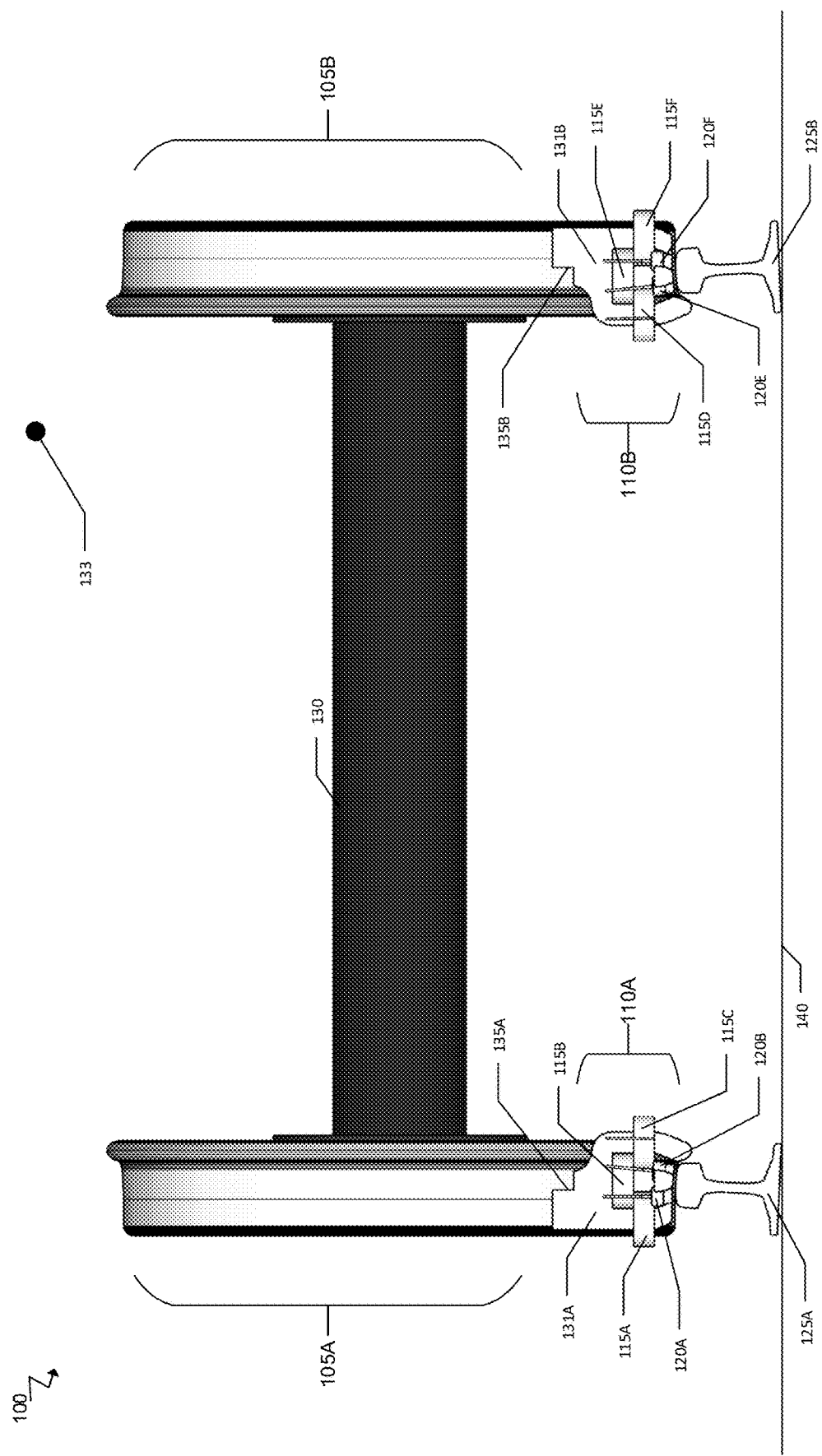
FIG. 1A illustrates a planar view of a wheeled bogie assembly, shown from a front perspective.

Various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Many problems affect the future growth and sustainability of rail-based transportation viz. (1) turnover resulting in derailment, (2) low traction resulting in inefficient operation on longitudinal grades, (3) low traction resulting in reduced braking capability, (4) hunting oscillation resulting in excessive rolling contact fatigue, (5) moving track switches which require excessive maintenance, and (6) emission of particulate matter. Each problem shall be discussed in turn herein.

Turnover is largely caused by two events. When turning with excessive speed, centrifugal inertia creates a moment about the outer rail, overcoming the gravitational load, resulting in lifting off the inner rail. The train will then roll over and derail. When stationary or at low speeds on a super elevation, cross slope, or canted railway track, the center of mass of the train is thus biased towards the inside rail. A lateral force such as cross-wind can now more easily over turn the train over the inside track. Safety is paramount for the future growth of rail travel. Therefore, reduction in turnover is a generally held goal of the entire rail industry.

On grades, rail wheels must maintain a certain amount of traction to climb grades. With inefficient traction, the wheels may slip. When wheels slip, passenger discomfort may result. Flat spots on rails introduce maintenance issues. Further, energy is wasted as the wheels freely spin without moving the bogie along the grade.

Braking force is increased with traction. However, existing bogie designs have few means to increase traction during braking operations, especially while the bogie is moving on a rail. If traction is reduced excessively, the bogie and truck may not be able to adequately brake, resulting in the wheel grinding the rail and creating a flat spot which requires repair—worse, a collision, derailment, loss of life, etc.

Hunting oscillation is the self-oscillation of moving railway wheelsets about an equilibrium. The swaying motion of a railway vehicle is often the result of hunting oscillation. The hunting oscillation phenomena is caused by the interaction of conical centering forces and inertial forces. At low velocity, the adhesion force may dominate. However, as velocity increases the adhesion forces and inertial forces become comparable in magnitude and the oscillation may begin. Hunting oscillation increases wear on the rail and wheelsets and may even result in unsafe operating conditions.

Rolling contact fatigue ("RCF") is considered to be the predominant cause of crack initiation and crack propagation in the rail. Many factors contribute to RCF including: environmental conditions, rail and wheel profiles, track curvatures, grades, lubrication practices, rail metallurgy, track geometry errors, excessive weight of vehicles, etc. To the extent that such factors can be mitigated, RCF may be minimized.

Surface crack initiation may result from wheel contact that plastically deforms the steel of the rail in the directions of applied tractions. As the deformation increases, the surface "ratchets" until the available ductility of the steel is exhausted. A surface crack results in the fractured steel, requiring repair. Failure to correct a significant surface crack may result in property damage or loss of life.

Once a surface crack develops, crack propagation may increase the area of surface negatively affected. Some types of steel may resist crack propagation better than others. However, wheel grease and other contaminants may enter the surface crack and reduce the resistance of the steel, thus introducing surface cracking. Water has a low viscosity and high surface tension and is therefore drawn into cracks by a capillary action. The main driving force behind crack propagation beyond the surface is hydraulicing. In the presence of water, hydralicing can cause cracks to propagate through the entire cross section of a rail. Therefore, crack prevention is key.

At some point, the RCF may no longer be considered the cause of the degradation of the rail because the damage is too far below the contact surface. However, degradation of the steel may continue due to thermal stresses (e.g., tensile stress in cold conditions), bending stress due to wheel load, residual stress from the rail manufacturing process, etc. In sum, RCF may be the cause of severe and irreversible damage requiring complete replacement of entire sections of rail.

When metal-to-metal contact occurs on a rail, there is a moment of intense force that causes particulate matter to be emitted. Up to two-thirds of the particulate matter emitted from a high-speed train originates from wheel-to-rail contact. The damage is typically concentrated near where the flange and wheel surface meet (radially). Some particulate matter is comprised of particularly fine particles. Specifically, $PM_{2.5}$ may pose a serious health risk to humans. Such fine particles reach deep into the lungs and even into the bloodstream. Short-term exposure has been associated with premature mortality, acute and chronic bronchitis, asthma attacks, etc. In short, emissions of particulate matter should be reduced if not completely eliminated, if only to improve human health.

The solution to the aforementioned problems is an electromagnetic guidance and traction system integrated into existing, conventional bogie designs. The proposed electromagnetic guidance system relies on a plurality of electromagnetic engines that create magnetic forces that interact with the steel rail. The magnetic force may provide additional traction for braking and climbing grades. Further, the magnetic forces exerted by the proposed solution may be dynamically adjusted while the bogie is moving, thus providing a more optimized amount of traction as conditions on the rail change (e.g., grade changes, weather changes, foreign matter on the rail, etc.). With improved traction, the rail industry can continue to expand to meet the needs of the future.

FIG. 1A illustrates a planar view of a wheeled bogie assembly 100, shown from a front perspective. The wheeled bogie assembly 100 comprises an axle 130, a first wheel assembly 105A, a second wheel assembly 105B, a first electromagnetic engine 110A, and a second electromagnetic engine 110B. The wheeled bogie assembly 100 may be positioned on a first rail 125A and a second rail 125B. In one aspect, the rails 125A, 125B may be a standard-gauge railway with a track gauge of 1,435 mm, often referred to as the Stephenson gauge. As shown, the rails 125A, 125B are flat-bottom rails which are commonly used in the United States. One of skill in the art will appreciate that other rail profiles may be utilized and be similarly operable for travel with the wheel assemblies 105A, 105B, including those substantially connected to the electromagnetic engines 110A, 110B. The rails 125A, 125B may be disposed on a rail support 140 (e.g., the ground).

A direction of travel ray 133 is depicted as a dot because the wheeled bogie assembly 100 is traveling toward the viewer. The ray 133 shall be used throughout this disclosure to enable the viewer to determine the direction of travel and orientation of the figures. When a dot is utilized herein for the ray 133, the wheeled bogie assembly 100 is traveling toward the viewer.

The first electromagnetic engine 110A and the second electromagnetic engine 110B may be disposed in front of the wheel assemblies 105A, 105B, respectively. The electromagnetic engines 110A, 110B may however be similarly disposed behind the wheel assemblies 105A, 105B, depending on commercial need, design considerations, operating environments, etc. Further, a bogie typically has a plurality of wheelsets; therefore, the electromagnetic engines 110A, 110B may be distributed between several wheelsets (including before and after the wheelsets). For clarity, one wheelset is shown in the instant figure. In one aspect, the electromagnetic engines 110A, 110B may be disposed on the locomotive and/or on the rear car in order to save deployment costs i.e., one to two points of guidance may be sufficient for some commercial applications.

The electromagnetic engine 110A comprises a steel core 131A with three prongs. The steel core 131A has an outer electromagnetic coil 115A, a center electromagnetic coil 115B, and an inner electromagnetic coil 115C. The center prong of the steel core 131A separates the coils 115A, 115C. The coil 115B is disposed higher than the coils 115A, 115C. Further, the coil 115B partially overlaps with the coils 115A, 115C, where the overlap is the result of the coil 115B being disposed higher. As shown in the instant figure, the overlap of the coil 115B is approximately one-third the width (or diameter) of the coil 115A as measured from the outer edge of the coil 115B. Likewise, the coil 115B is overlapping with the coil 115C by approximately one-third the width (or diameter) of the coil 115B. One of skill in the art will appreciate that the overlap may vary slightly without deviating from the intended purpose of the coils 115A, 115B, 115C. In a similar manner to the electromagnetic engine 110A, the electromagnetic engine 110B may have a steel core 131B with an inner coil 115D, a center coil 115E, and an outer coil 115F. One of skill in the art will appreciate that the coils 115D, 115E, 115F are configured according to the symmetry of the bogie assembly 100.

The coils 115A, 115B, 115C, 115D, 115E, 115F provide an excitation source to generate an electromagnetic field at a certain frequency. Such an electromagnetic field may permeate the rails 125A, 125B, as governed by the laws of electromagnetism. The depth of electromagnetic field permeation is a function of the frequency of the field, the permeability of the material, and the conductivity of the material.

The electromagnetic engine 110A further comprises a first electromagnetic sensor 120A, a second electromagnetic sensor 120B, and a third electromagnetic sensor 120C (obstructed in the instant view). The electromagnetic sensors 120A, 120B, 120C are generally operable to detect the presence and strength of magnetic force. In one aspect, the detected magnetic force may be the result of generated electromagnetic force resulting from the excitement of the electromagnetic coils 115A, 115B, 115C.

The electromagnetic sensors 120A, 120B, 120C may take many implementations in the commercial deployment of the electromagnetic engine 110A. In one aspect, the electromagnetic sensors 120A, 120B, 120C may be implemented using electromagnetic coils, which provide the advantage of being relatively elegant in design. In another aspect, Hall-effect elements may be utilized as the electromagnetic sensors 120A, 120B, 120C. Hall-effect elements provide the advantage of relatively precise areas of measurement. In yet another aspect, the electromagnetic sensors 120A, 120B, 120C may be implemented using magneto-resistive devices. Each of the various implementations of the electromagnetic sensors 120A, 120B, 120C have advantages and disadvantages, all of which one of skill in the art will balance given the intended commercial deployment.

In one aspect, the sensors 120A, 120B, 120C may be individual computing devices capable of measuring, storing, and processing real-world measurements. In another aspect, the sensors 120A, 120B, 120C may be connected to a computer (or controller) operable to measure, store, and process the real-world measurements observed by the sensors 120A, 120B, 120C.

The electromagnetic engine 110B comprises a steel core 131B with three prongs. The steel core 131B has an inner electromagnetic coil 115D, a center electromagnetic coil 115E, and an outer electromagnetic coil 115F. The coils 115D, 115E, 115F are substantially similar to the coils 115A, 115B, 115C. The electromagnetic engine 110B further comprises a first electromagnetic sensor 120D (obstructed in the instant view), a second electromagnetic sensor 120E, and a third electromagnetic sensor 120F. The sensors 120D, 120E, 120F may be substantially similar to the sensors 120A, 120B, 120C.

One of skill in the art will appreciate that the second electromagnetic engine 110B is a symmetrical instance of the first electromagnetic engine 110A, with the difference being that the electromagnetic engine 110B is configured for the rail 125B. One of skill in the art will further appreciate that the electromagnetic engines 110A, 110B may or may not be disposed in parallel. Therefore, in one aspect, either one of the electromagnetic engines 110A, 110B may not be present in the wheeled bogie assembly 100.

A surface 135A may be present on the steel core 131A. Likewise, a surface 135B may be present on the steel core 131B. The surfaces 135A, 135B are generally operable to provide a calibrated distance between the electromagnetic engines 110A, 110B. In one aspect, the calibrated distance may be utilized to generate a signature related to a substantially ideal track gauge.

Figure 1B:
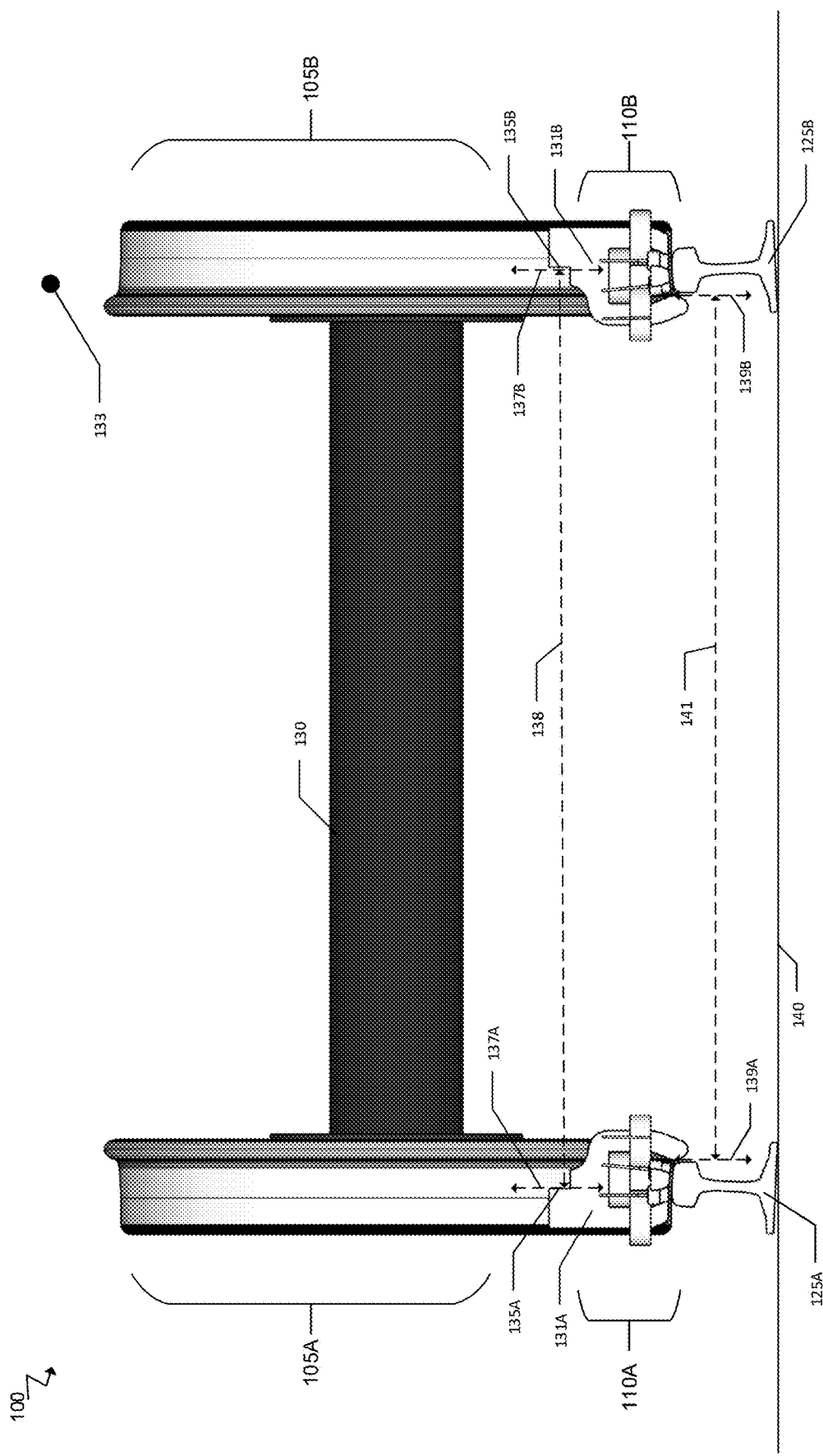
FIG. 1B illustrates a planar view of a wheeled bogie assembly, shown from a front perspective.

FIG. 1B illustrates a planar view of the wheeled bogie assembly 100, shown from a front perspective. The surfaces 135A, 135B are separated by a distance 138 defined by a left axis 137A and a right axis 137B. The distance 138 is generally utilized as a calibration means to detect deviations from a nominal distance between the rails 125A, 125B. For instance, the track gauge may be 1,435 mm. In operation, the distance 138 may be utilized in conjunction with the electromagnetic engines 110A, 110B to identify deviations from the nominal track gauge.

The distance 138 may be determined by operating the wheeled bogie assembly 100 over a segment of track that is substantially machined to be at or near the nominal distance desired (e.g., 1,435 mm). In the instant figure, a distance 141 is bounded by a left axis 139A and a right axis 139B. The distance 141 may be at or near the nominal distance of the track gauge. As stated, the distance 138 between the electromagnetic engines 110A, 110B may be utilized to determine deviations from the distance 141 as measured by the electromagnetic engines 110A, 110B. The distances 138, 141 may have some deviation from ideal distances, and such deviations may be accounted for by the electromagnetic engines 110A, 110B when deployed in commercial use.

Figure 1C:
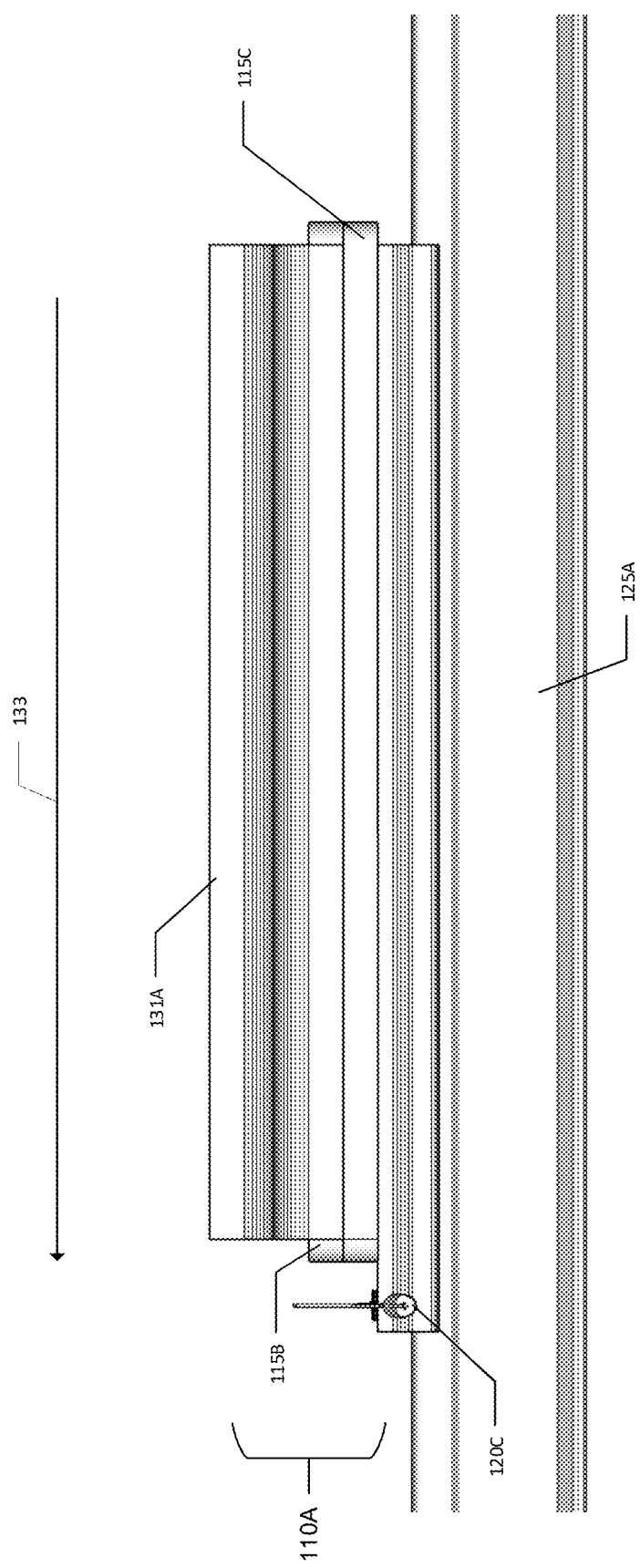
FIG. 1C illustrates a planar view of an electromagnetic engine, shown from a side perspective.

FIG. 1C illustrates a planar view of the electromagnetic engine 110A, shown from a side perspective. The electromagnetic sensor 120C is shown without obstruction in the instant figure cf. with FIG. 1A. One of skill in the art will appreciate that the wheeled bogie assembly 100, in operation, would be traveling along the ray 133.

Figure 1D:
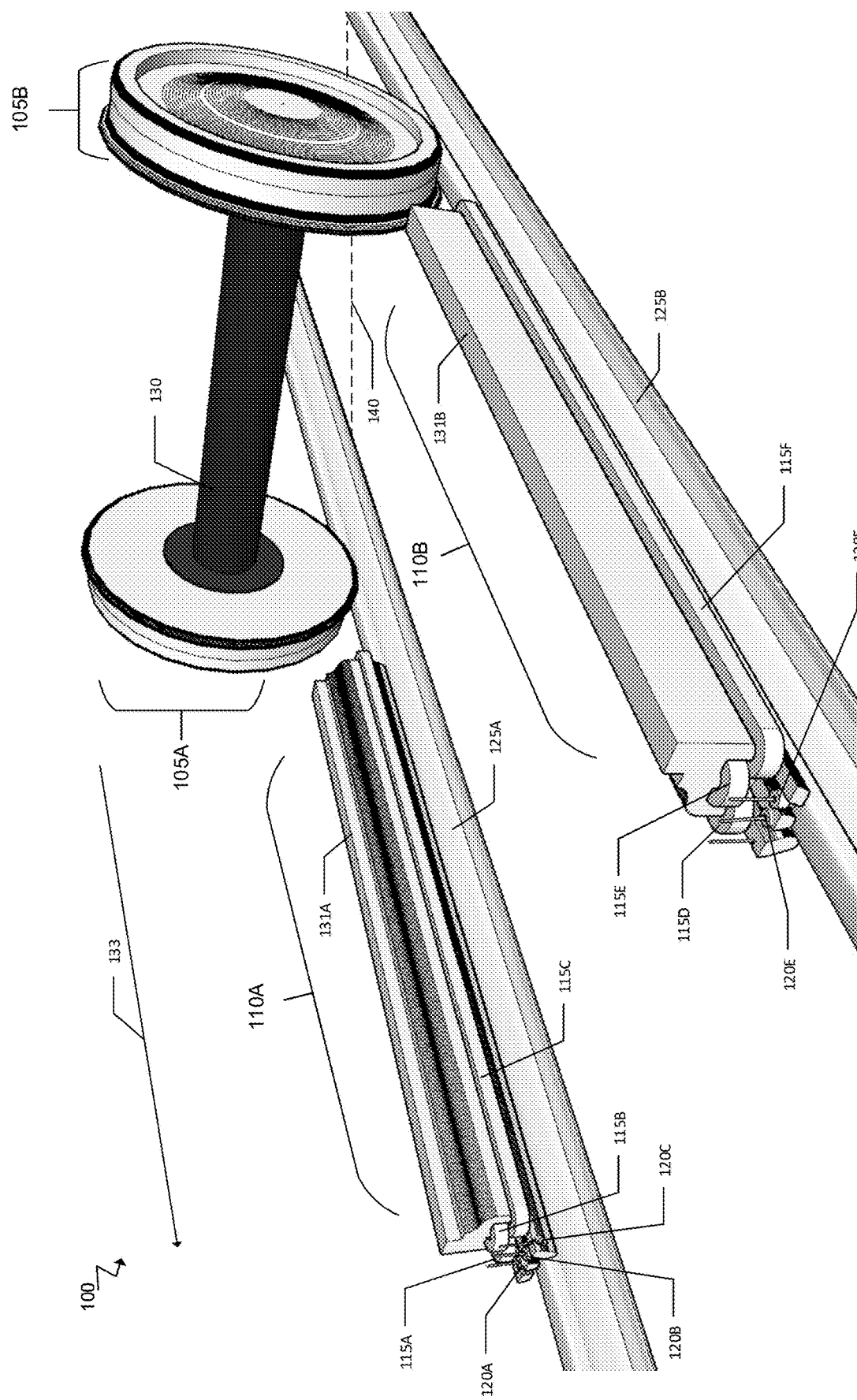
FIG. 1D illustrates a three-quarter perspective of a wheeled bogie assembly, as shown from a front perspective.

FIG. 1D illustrates a three-quarter perspective of the wheeled bogie assembly 100, as shown from a front perspective. One of skill in the art will appreciate that the wheeled bogie assembly 100 in operation would be traveling along the ray 133. In one aspect, the instant figure provides an example of a segment of track operable to generate a signature of ideal and/or desired conditions of track deployed in normal commercial use. Such ideal track segments may be calibrated and configured using methods and means not generally available in fielded track segments.

Figure 1E:
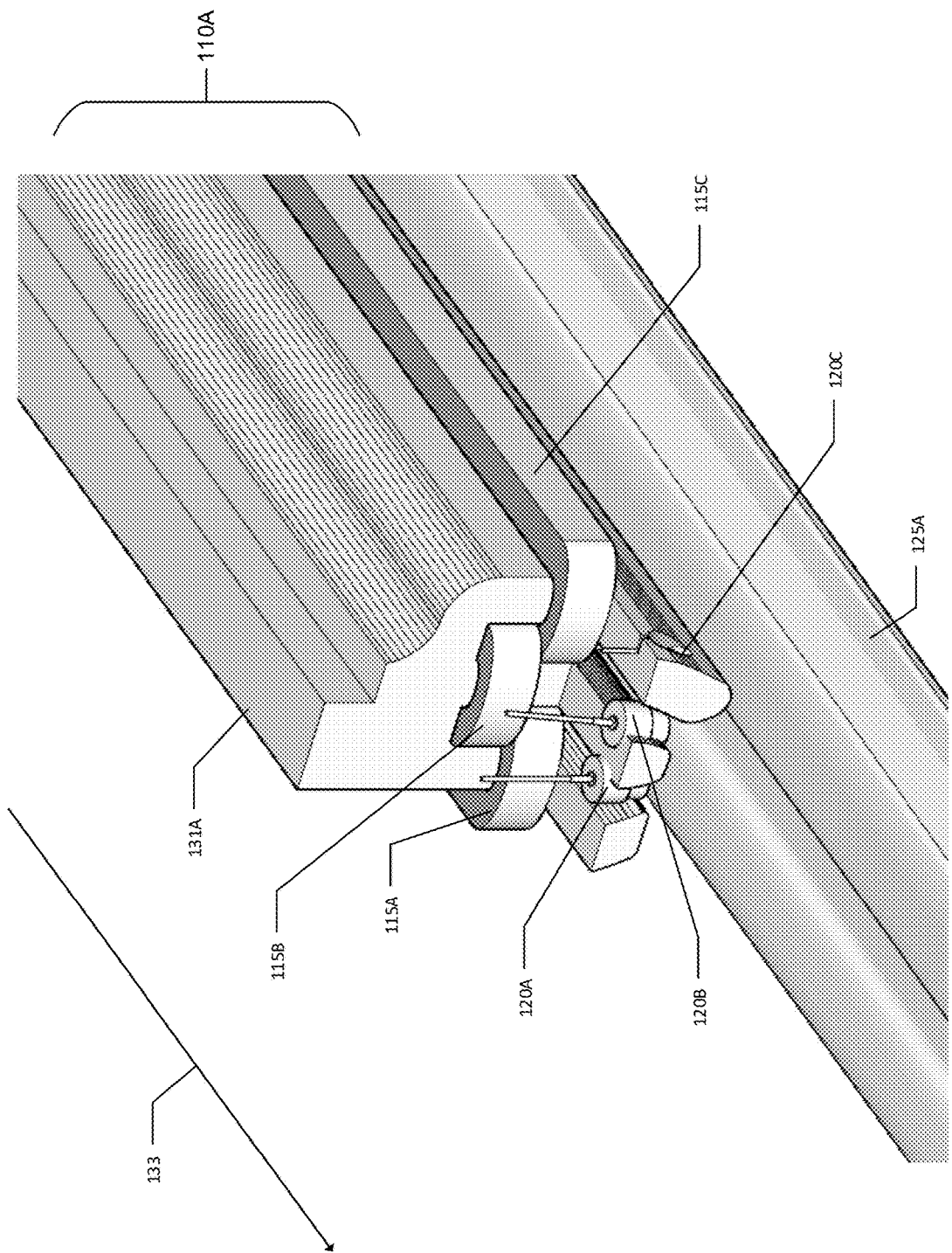
FIG. 1E illustrates a three-quarter perspective of an electromagnetic engine, as shown from a front perspective.

FIG. 1E illustrates a three-quarter perspective of the electromagnetic engine 110A, as shown from a front perspective. One of skill in the art will appreciate that the wheeled bogie assembly 100 in operation would be traveling along the ray 133.

FIG. 1F illustrates a planar view of the electromagnetic engine 110A, as shown from a front perspective. The steel core 131A comprises an inner prong 143A, a center prong 143B, and an outer prong 143C. The coils 115A, 115B, 115C may be disposed around an outer prong 143A, a center prong 143B, and an inner prong 143C, respectively. The inner prong 143A curves slightly toward the rail 125A to increase inner attractive force 160A which is reacted by the rail 125A. The inner attractive force 160A is generated by the prongs 143A, 143B when the coils 115B, 115C are excited.

The outer prong 143C is curved toward the head of the rail 125A. Similar to the prong 143A, the orientation of the prong 143C enables an outer magnetic force 160B to travel through the prongs 143B, 143C.

The air gap between the rail 125A and the electromagnetic engine 110A is shown in the instant figure in more detail. One of skill in the art will appreciate the lack of physical contact between the rail 125A and the prongs 143A, 143B, 143C. One of skill in the art will further appreciate from the instant figure that the magnetic forces 160A, 160B represent flux produced by excitation of the coils 115A, 115B, 115C. Hence the flux is understood to flow substantially in a loop comprising at least two of the prongs in the electromagnetic engine 110A.

Figure 1G:
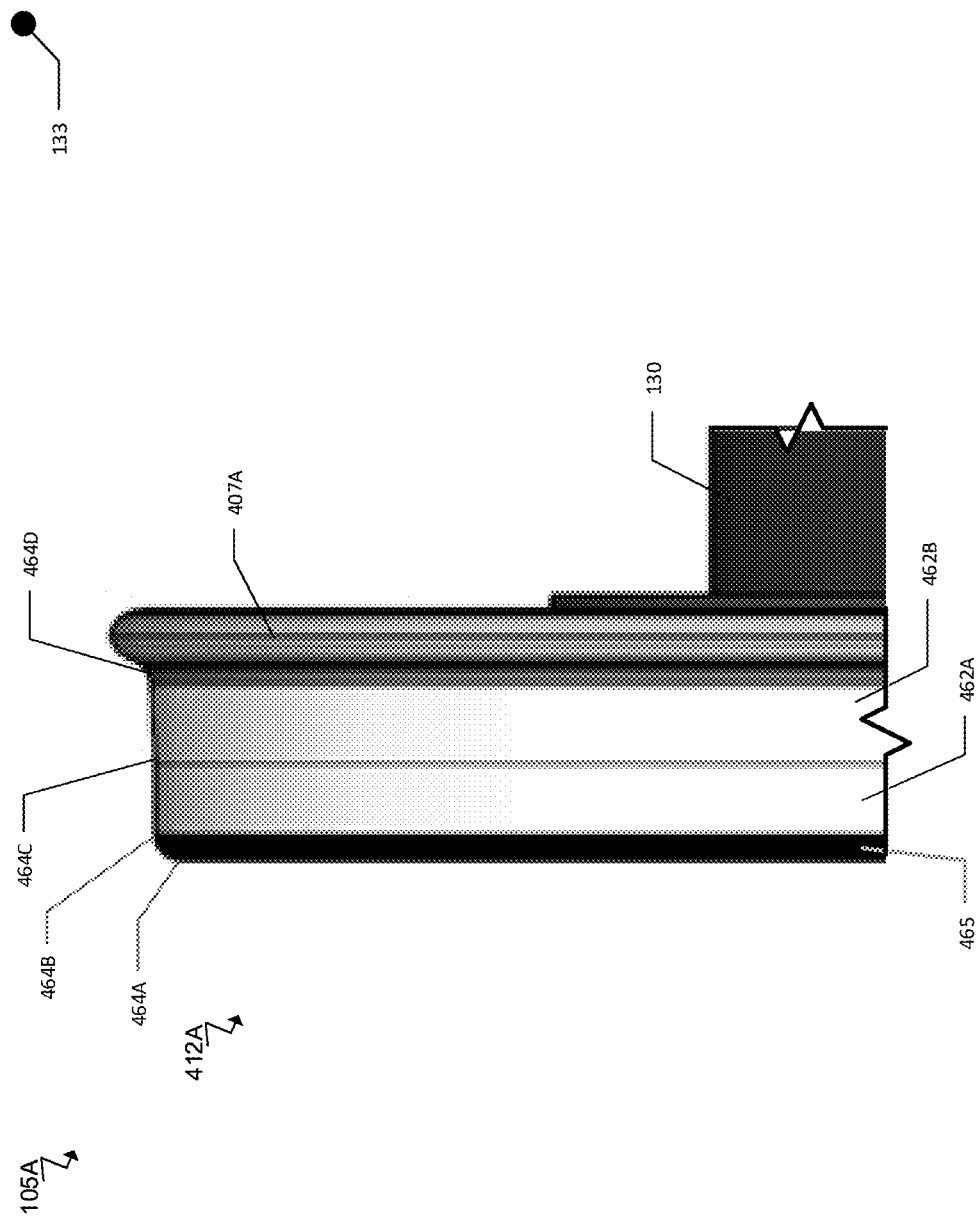
FIG. 1G illustrates a planar view of a wheel assembly, as shown from a front perspective.

FIG. 1G illustrates a planar view of the wheel assembly 105A, as shown from a front perspective. A wheel 412A has a flange 407A on the outboard side.

The wheel 412A is formed with a cylindrical section 462A and a conical section 462B. The cylindrical section 462A is defined between a diameter 464B and a diameter 464C. The cylindrical section 462A is substantially flat between the diameters 464B, 464C. The cylindrical section 462A may have a shrinking diameter 465, that leads to an outer diameter 464A on the field side of the wheel 412A. The conical section 462B is positioned between the diameter 464C and a diameter 464D. One of skill in the art will appreciate that the wheel assemblies 105A, 105B are substantially similar with respect to the design disclosed in the instant figure.

Figure 2A:
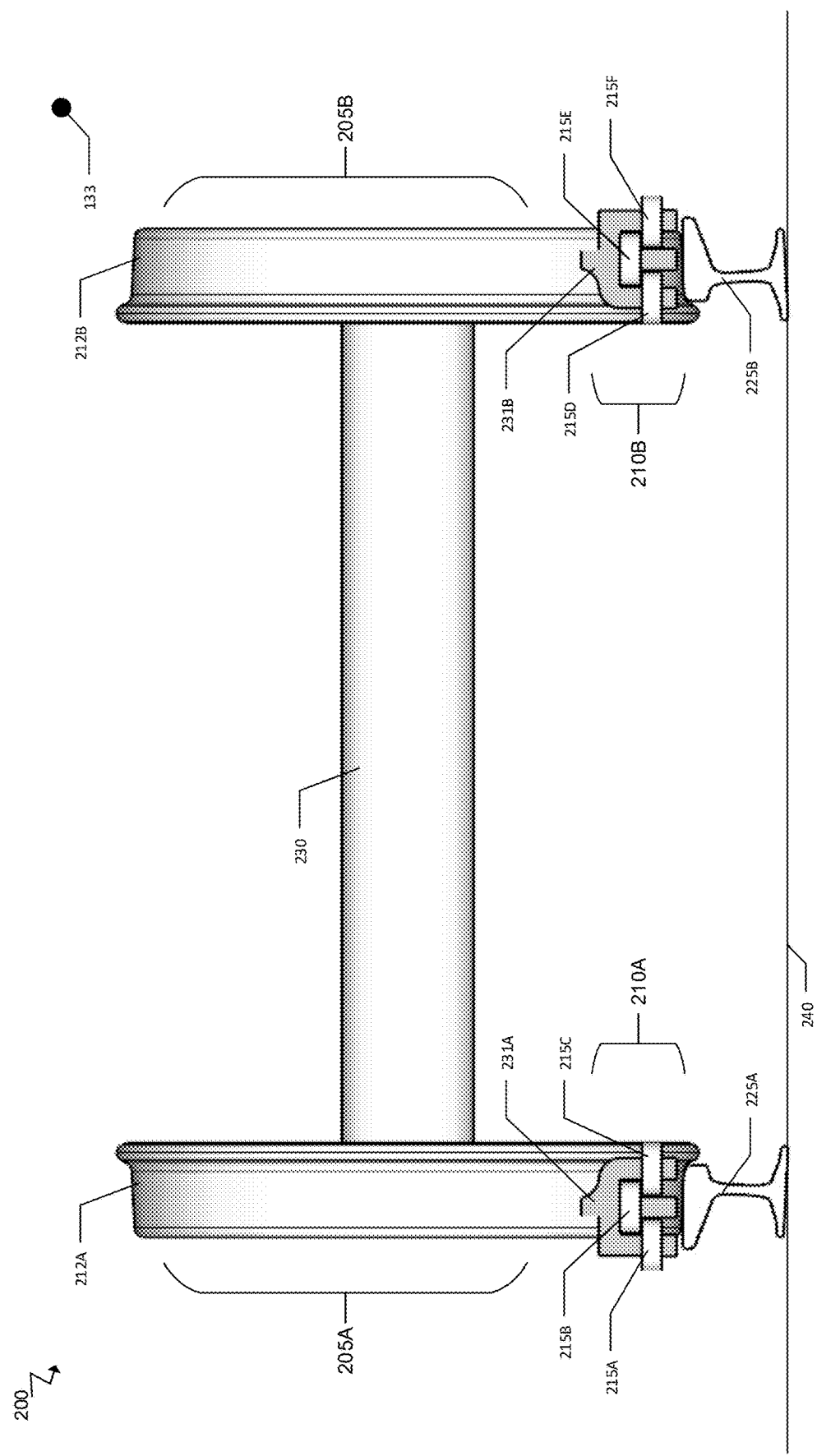
FIG. 2A illustrates a planar view of a wheeled bogie assembly, shown from a front perspective.

FIG. 2A illustrates a planar view of a wheeled bogie assembly 200, shown from a front perspective. The wheeled bogie assembly 200 comprises a first wheel assembly 205A operably connected by an axle 230 to a second wheel assembly 205B. The axle 230 is disposed between the wheel assemblies 205A, 205B. As shown in the instant figure, the wheeled bogie assembly 200 is traveling toward the viewer.

The wheel assembly 205A comprises a wheel 212A. Likewise, the wheel assembly 205B comprises a wheel 212B. The wheel 212A has a flange along the outboard side of the wheeled bogie assembly 200. The wheel 212B has a flange along the outboard side of the wheeled bogie assembly 200. The wheels 212A, 212B are semi-conical between the edge of the flange and the outer radius. In one aspect, the wheels 212A, 212B may have a substantially flat surface at or near the midpoint of the contact surface to the outer radius. One of skill in the art will appreciate that the inner radii of the wheels 212A, 212B are substantially larger than the outer radii of the wheels 212A, 212B as shown in the instant figure.

A first rail 225A and a second rail 225B are supported by a rail support surface 240. The rails 225A, 225B may be steel rails in one aspect. As shown, the rails 225A, 225B are flat-bottom rails which are commonly used in the United States. One of skill in the art will appreciate that other rail profiles may be utilized and be similarly operable for travel with the wheels 212A, 212B. The rails 225A, 225B are inclined toward the bogie assembly 200. One of skill in the art will appreciate that modern rail systems have a number of various ratios of incline similar to the instant ratios of incline shown in the instant figure.

A first electromagnetic engine 210A and a second electromagnetic engine 210B may be disposed in front of the wheel assemblies 205A, 205B, respectively. The electromagnetic engines 210A, 210B may however be similarly disposed in front of the wheel assemblies 205A, 205B, depending on the perspective of the viewer. Further, a bogie typically has a plurality of wheelsets; therefore, the electromagnetic engines 210A, 210B may distributed between several wheelsets. For clarity, one wheelset is shown in the instant figure as comprised by the wheel assemblies 205A, 205B.

The electromagnetic engine 210A comprises a steel core 231A with three prongs. The steel core 231A has an outer electromagnetic coil 215A, a center electromagnetic coil 215B, and an inner electromagnetic coil 215C. The center prong of the steel core 231A separates the coils 215A, 215C. In the depicted embodiment, the coil 215B is disposed higher than the coils 215A, 215C. Further, the coil 215B partially overlaps with the coils 215A, 215C, wherein the overlap is the result of the coil 215B being disposed further above the rails 225A, 225B. As shown in the instant figure, the overlap of the coil 215B is approximately one-third the width (or diameter) of the coil 215A as measured from the outer edge of the coil 215A. Likewise, the coil 215B is overlapping with the coil 215C by approximately one-third the width (or diameter) of the coil 215B. One of skill in the art will appreciate that the overlap may vary slightly without deviating from the intended purpose of the coils 215A, 215B, 215C.

The electromagnetic engine 210B comprises a steel core 231B with three prongs. The steel core 231B has an inner electromagnetic coil 215D, a center electromagnetic coil 215E, and an outer electromagnetic coil 215F. The center prong of the steel core 231B separates the coils 215D, 215F. In the depicted embodiment, the coil 215E is disposed higher than the coils 215D, 215F. Further, the coil 215E partially overlaps with the coils 215D, 215F, wherein the overlap is the result of the coil 215E being disposed further above the rails 225A, 225B. As shown in the instant figure, the overlap of the coil 215E is approximately one-third the width (or diameter) of the coil 215D as measured from the outer edge of the coil 215D. Likewise, the coil 215E is overlapping with the coil 215F by approximately one-third the width (or diameter) of the coil 215E. One of skill in the art will appreciate that the overlap may vary slightly without deviating from the intended purpose of the coils 215D, 215E, 215F.

An air gap exists between the steel core 231A and the rail 225A. Each prong of the steel core 231A maintains substantially the same distance from the rail 225A to prevent contact with the rail 225A while still maintaining proximity to the rail 225A for attractive and/or repulsive magnetic force as generated by the coils 215A, 215B, 215C. Similarly, an air gap exists between the steel core 231B and the rail 225B. Each prong of the steel core 231B maintains substantially the same distance from the rail 225B to prevent contact with the rail 225B while still maintaining proximity to the rail 225B for bidirectional magnetic force as generated by the coils 215D, 215E, 215F.

FIG. 2B illustrates a planar view of the wheeled bogie assembly 200, shown from a side perspective. The ray 133 is depicted pointing to the left, thus showing the direction of travel. As shown, the wheeled bogie assembly 200 is depicted with two separate wheel assemblies. One of skill in the art will appreciate the rightmost wheel is substantially similar to the wheel assembly 205B, shown in the instant figure.

The electromagnetic engine 210B is depicted as being disposed along the rail 225B in parallel. One of skill in the art will appreciate that having a longer or shorter electromagnetic engine 210B correspondingly increases or decreases the potential magnetic forces generated between the rail 225B and the electromagnetic engine 210B itself. In implementation, any number of considerations may affect the need for varying lengths of the electromagnetic engine 210B (e.g., braking systems, sensor modules, traditional guidance systems relying on additional wheels, rail conditions, etc.). One of skill in the art will appreciate the capability for the solution proposed herein to be implemented with any conceivable length to fit between existing and/or necessary systems which require contact with or proximity to the rail 225B.

Figure 2C:
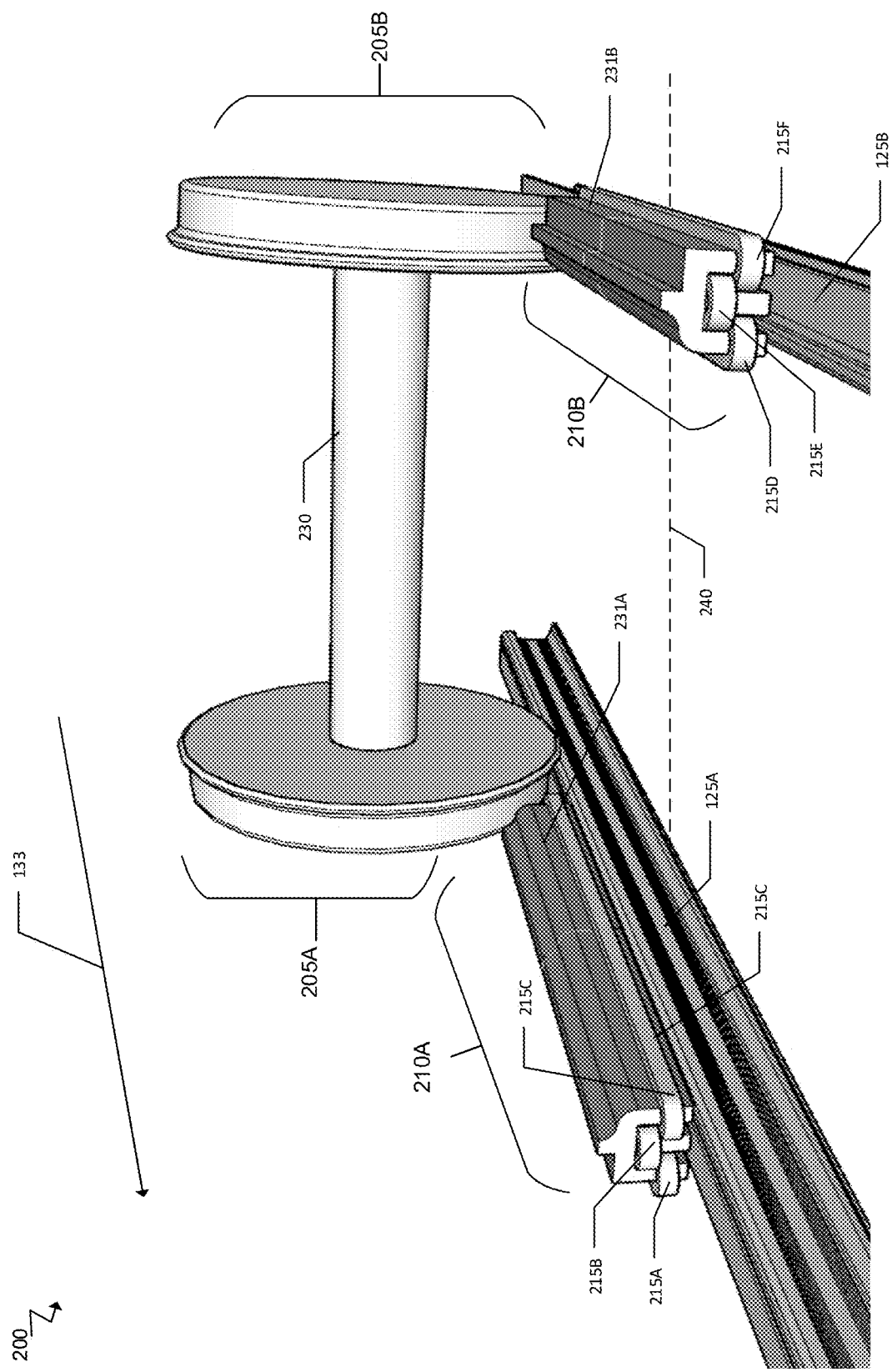
FIG. 2C illustrates a three-quarter perspective of a wheeled bogie assembly, as shown from a front perspective.

FIG. 2C illustrates a three-quarter perspective of a wheeled bogie assembly, as shown from a front perspective. One of skill in the art will appreciate that the steel cores 231A, 231B would be attached to the undercarriage of the bogie (not shown). The air gaps between the rails 225A, 225B and the electromagnetic engines 210A, 210B are clearly shown such that one of skill in the art will appreciate that substantially no portion of the steel cores 231A, 231B physically touches the rails 225A, 225B, respectively.

Figure 2D:
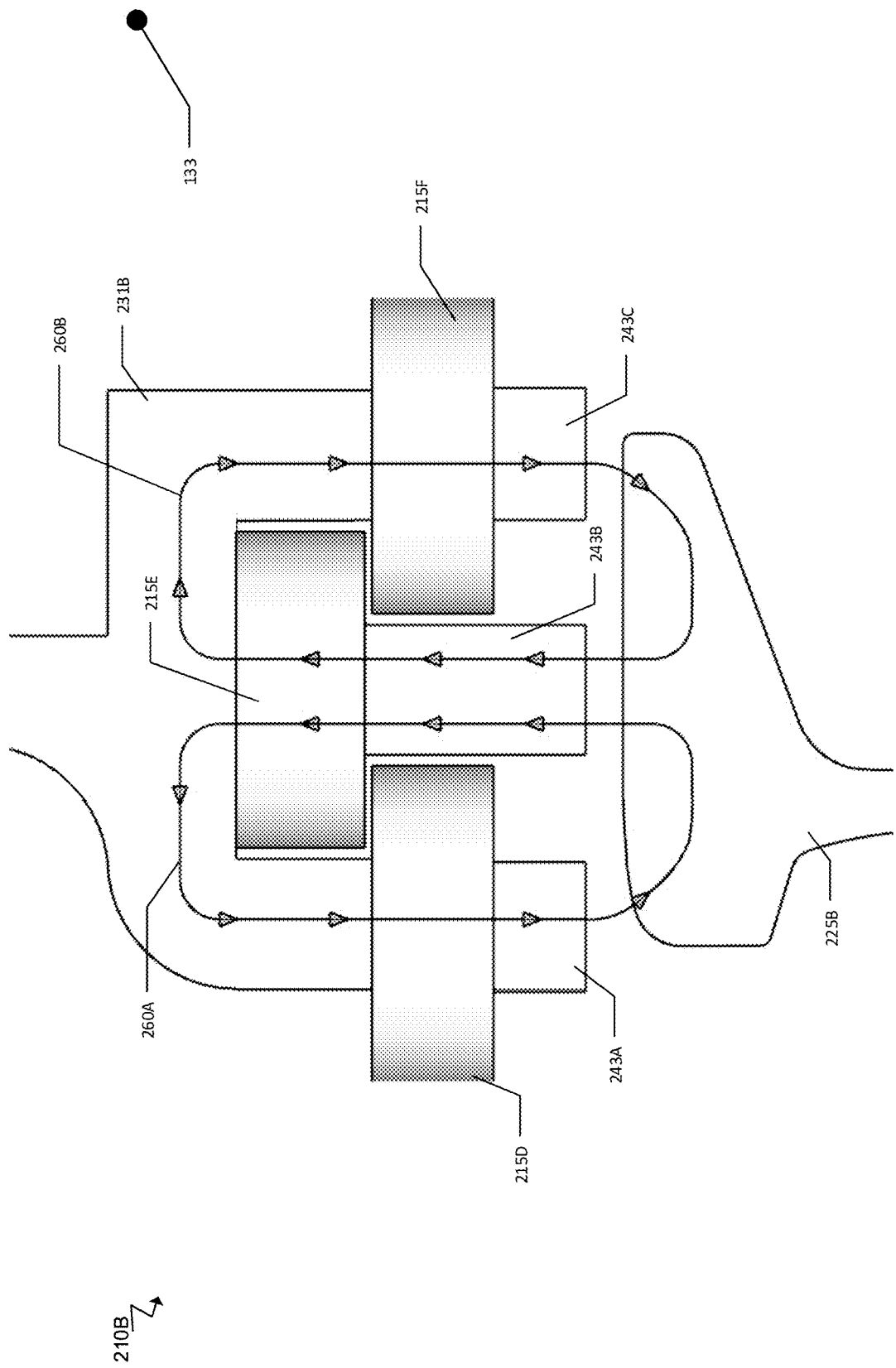
FIG. 2D illustrates a planar view of an electromagnetic engine, as shown from a front perspective.

FIG. 2D illustrates a planar view of the electromagnetic engine 210B, as shown from a front perspective. The steel core 231B comprises an inner prong 243A, a center prong 243B, and an outer prong 243C. As previous discussed, the coils 215D, 215E, 215F are disposed around the prongs 243A, 243B, 243C. An inner attractive force 260A travels through the rail 225B. The inner attractive force 260A is generated by the prongs 242A, 243B when the coils 215D, 215E are excited. An outer magnetic force 260B travels through the prongs 243B, 243C. The outer magnetic force 260B is generated by the prongs 243B, 243C as created by the coils 215E, 215F.

An air gap is shown in the instant figure in more detail. One of skill in the art will appreciate the lack of physical contact between the rail 225B and the prongs 243A, 243B, 243C. It may also be appreciated that the electromagnetic engine 210B is comprised of the prongs 243A, 243B, 243C, and that the prongs 243A, 243B, 243C are substantially of the same length, such that the airgap between the prongs 243A, 243B, 243C and the rail 225B occurs at approximately the same height in the vertical direction as depicted. Thus, the electromagnetic engine 210B may translate laterally with respect to the rail 225B without resulting in mechanical interference between the electromagnetic engine 210B and the rail 225B. The electromagnetic engine 210B may be understood to produce varying forces in each lateral position as the coils 215D, 215E, 215F are excited by an electric current.

Figure 3A:
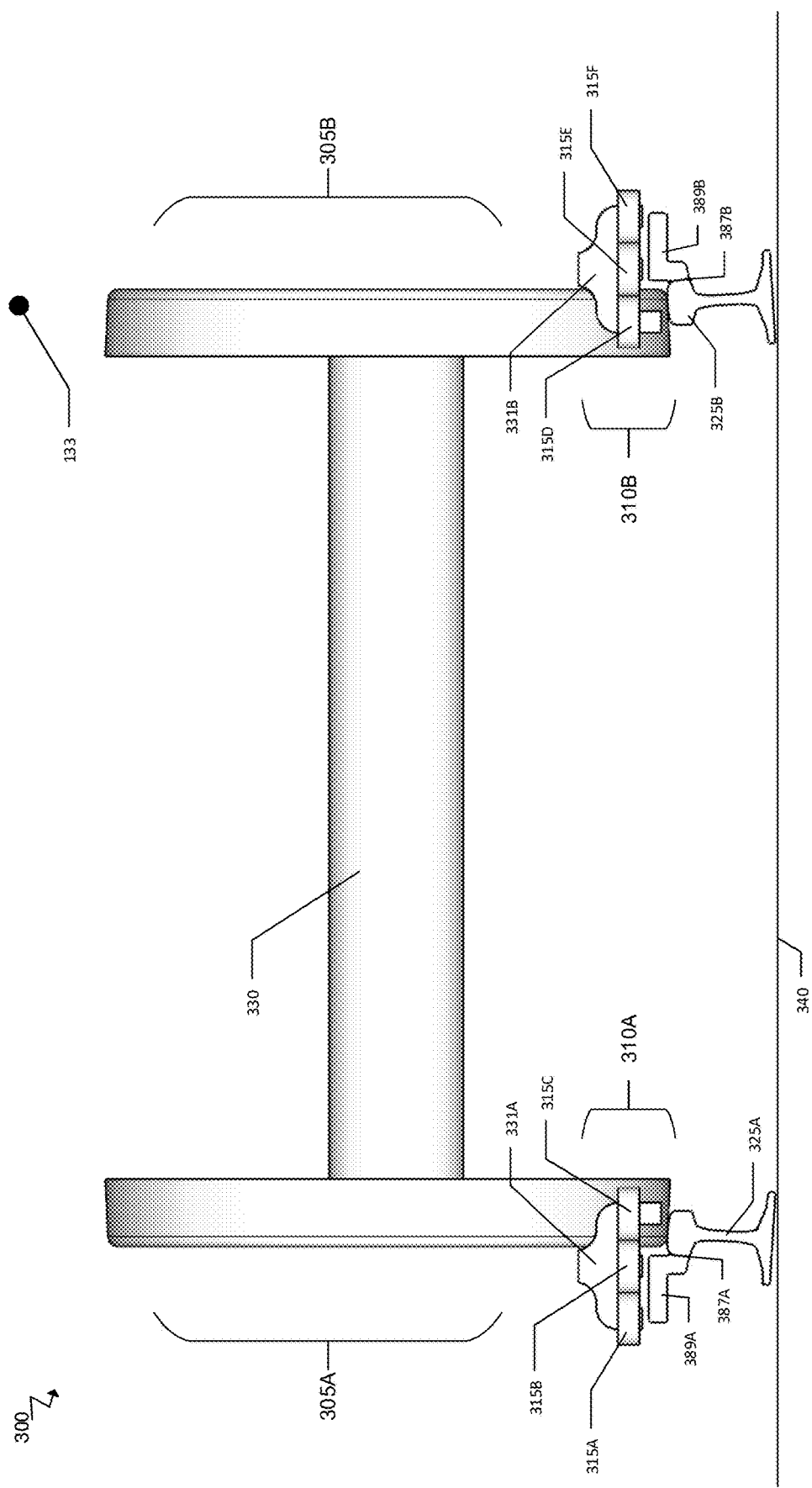
FIG. 3A illustrates a planar view of a wheeled bogie assembly, shown from a front perspective.

FIG. 3A illustrates a planar view of a wheeled bogie assembly 300, shown from a front perspective. The wheeled bogie assembly 300 comprises a first wheel assembly 305A operably connected by an axle 330 to a second wheel assembly 305B. The axle 330 is disposed horizontally. As shown in the instant figure, the wheeled bogie assembly 300 is traveling toward the viewer. The wheel assemblies 305A, 305B are oriented with radii substantially perpendicular to the axle 330. The axle 330 is disposed between the wheel assemblies 305A, 305B. The ray 133 is depicted as a dot to indicate travel toward the viewer.

The wheel assembly 305A comprises a wheel 312A. Likewise, the wheel assembly 305B comprises a wheel 312B. The wheels 312A, 312B are semi-conical, with decreasing radii as measured from the inner radii to the outer radii. In one aspect, the wheels 312A, 312B may have a substantially flat surface substantially from the midpoint of the contact surface to the outer radius. One of skill in the art will appreciate that the inner radii of the wheels 312A, 312B are substantially larger than the outer radii of the wheels 312A, 312B as shown in the instant figure.

A first rail 325A and a second rail 325B are supported by a rail support surface 340. The rails 325A, 325B may be steel rails in one aspect. As shown, the rails 325A, 325B are flat-bottom rails which are commonly used in the United States. One of skill in the art will appreciate that other rail profiles may be utilized and be similarly operable for travel with the wheels 212A, 212B. The rails 325A, 325B are each respectively connected to a rail extension 389A and a rail extension 389B. The rail extensions 389A, 389B are respectively connected to the rails 325A, 325B by an attachment point 387A and an attachment point 387B. The attachment points 387A, 387B may be formed by welding the rail extensions 389A, 389B to the rails 325A, 325B, respectively.

The rail extensions 389A, 389B may provide for a wider horizontal surface with which the electromagnetic engines 310A, 310B may interact. In one aspect, the rail extensions 389A, 389B may provide a cost-effective solution to retrofit existing rails for guidance using the electromagnetic engines 310A, 310B. One of skill in the art will appreciate that selected portions of the rail may be fitted or not fitted with the rail extensions 389A, 389B. For instance, the rails along a flat area of land may require less guidance than a curved portion of rail, winding through a mountain pass.

A first electromagnetic engine 305A and a second electromagnetic engine 310B may be disposed in front of the wheel assemblies 305A, 305B, respectively. The electromagnetic engines 310A, 310B may however be similarly disposed in front of the wheel assemblies 305A, 305B, depending on the perspective of the viewer. Further, a bogie typically has a plurality of wheelsets; therefore, the electromagnetic engines 310A, 310B may be distributed between several wheelsets. For clarity, one wheelset is shown in the instant figure as comprised by the wheel assemblies 305A, 305B.

The electromagnetic engine 305A comprises a steel core 331A with three prongs. The steel core 331A has an outer electromagnetic coil 315A, a center electromagnetic coil 315B, and an inner electromagnetic coil 315C. The center prong of the steel core 331A separates the coils 315A, 313C. Given the substantially horizontal alignment of the coils 315A, 315B, 315C, 315D, 315E, 315F, the rail extensions 389A, 389B enable magnetic force to be generated between the outer coils 315A, 315F and the center coils 315B, 315D.

An air gap exists between the steel core 331A and the rail 325A. Each prong of the steel core 331A maintains substantially the same distance from the rail 325A to prevent contact with the rail 325A while still maintaining proximity to the rail 325A for attractive and/or repulsive magnetic force as generated by the coils 315A, 315B, 315C. Similarly, an air gap exists between the steel core 331B and the rail 325B. Each prong of the steel core 331B maintains substantially the same distance from the rail 325B and rail extension 389B to prevent contact with the rail 325B and rail extension 389B while still maintaining proximity to the rail 325B for attractive and/or repulsive magnetic force as generated by the coils 315D, 315E, 315F.

Figure 3B:
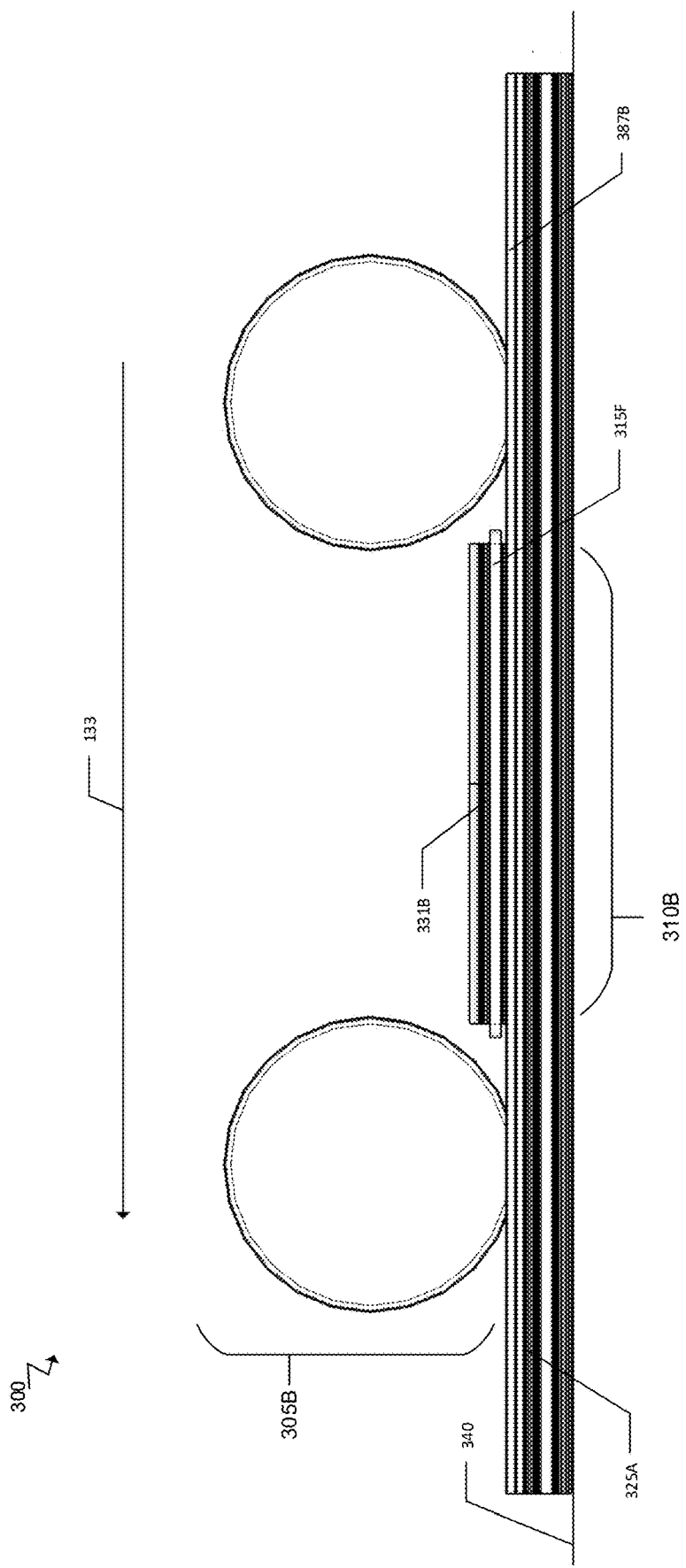
FIG. 3B illustrates a planar view of an electromagnetic engine, shown from a side perspective.

FIG. 3B illustrates a planar view of the electromagnetic engine 310B, shown from a side perspective. The ray of travel 133 points to the left to indicate the direction of travel. As shown, the wheeled bogie assembly 300 is depicted with two separate wheel assemblies. One of skill in the art will appreciate the rightmost wheel is substantially similar to the wheel assembly 305B.

The electromagnetic engine 310B is depicted as being disposed along the rail 325B. One of skill in the art will appreciate that having a longer or shorter electromagnetic engine 310B correspondingly increases or decreases the potential magnetic forces generated between the rail 325B and the electromagnetic engine 310B itself. In implementation, any number of constraints may require varying lengths of the electromagnetic engine 310B (e.g., braking systems, sensor modules, traditional guidance systems relying on additional wheels, etc.). One of skill in the art will appreciate the capability for the solution proposed herein to be implemented with any conceivable length to fit between existing and/or necessary systems which require contact with or proximity to the rail 325B.

Figure 3C:
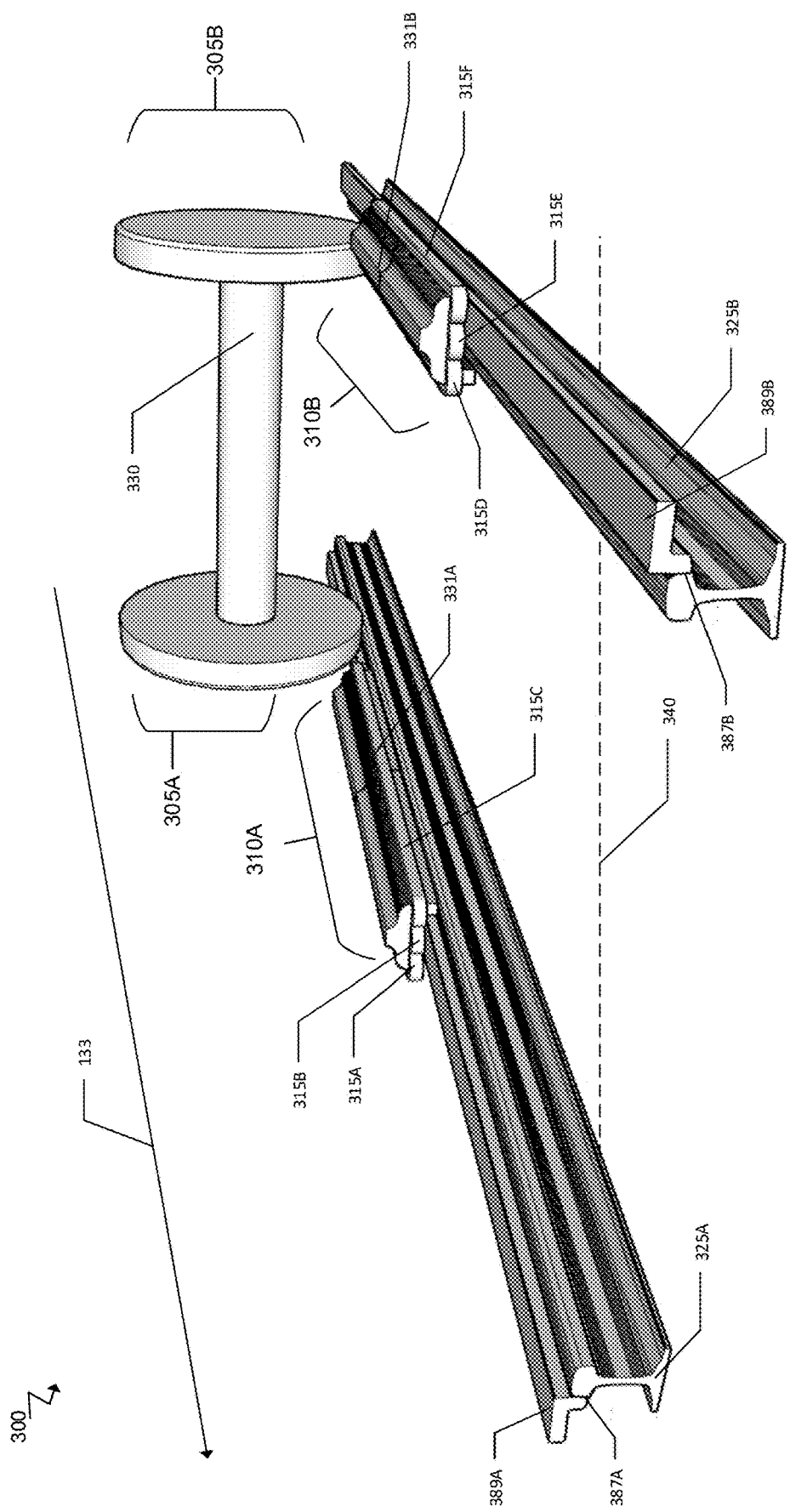
FIG. 3C illustrates a three-quarter perspective of a wheeled bogie assembly, as shown from a front perspective.

FIG. 3C illustrates a three-quarter perspective of a wheeled bogie assembly, as shown from a front perspective. One of skill in the art will appreciate that the steel cores 331A, 331B would be attached to the undercarriage of the bogie (not shown). The air gaps between the steel cores 331A, 331B and the rails 325A, 325B are clearly shown such that one of skill in the art will appreciate that substantially no portion of the steel cores 331A, 331B physically touches the rails 325A, 325B, respectively.

Figure 3D:
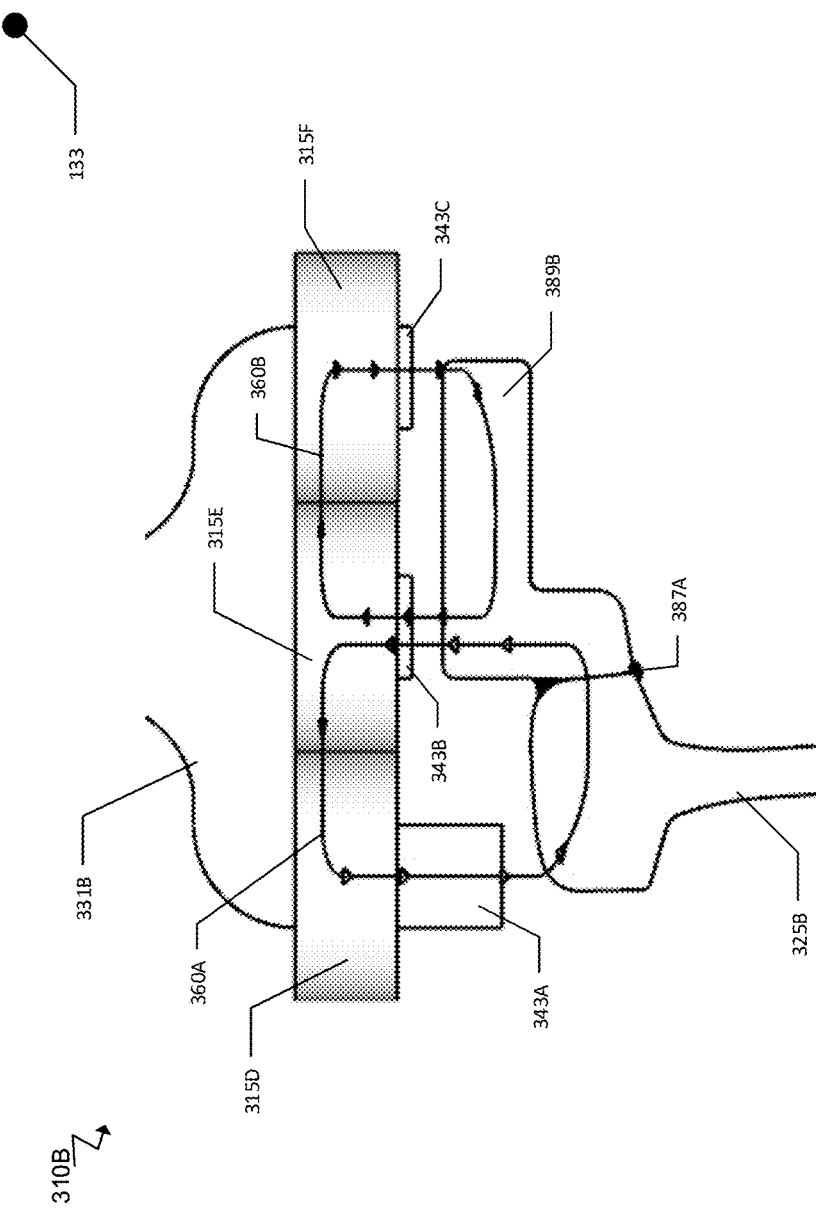
FIG. 3D illustrates a planar view of an electromagnetic engine, as shown from a front perspective.

FIG. 3D illustrates a planar view of the electromagnetic engine 310B, as shown from a front perspective. The steel core 331B comprises an inner prong 343A, a center prong 343B, and an outer prong 343C. As previous discussed, the coils 315D, 315E, 315F are respectively disposed around the prongs 343A, 343B, 343C. An inner attractive force 360A travels through the rail 325B and the rail extension 389B. The inner attractive force 360A is generated by the prongs 343A, 343B when the coils 315D, 315E are excited. An outer magnetic force 360B travels through the prongs 343B, 343C. The outer magnetic force 360B is generated by the prongs 343B, 343C when the outer coils 315E, 315F are excited. The outer magnetic force 360B travels through both the rail 325B and the rail extension 389B.

An air gap is shown in the instant figure in more detail. One of skill in the art will appreciate the lack of physical contact between the rail 325B (and rail extension 389B) and the prongs 343A, 343B, 343C. It may also be appreciated that the rail 325B and the rail extension 389B comprise a lateral mechanical constraint on the wheel assembly 305B, such that the wheel assembly 305B may not translate in the rightward direction without contacting the rail extension 389B. This feature may improve vehicle safety by making derailment less likely. It may be further appreciated that this mechanical constraint feature is accomplished by wheel assembly 105B in FIG. 1A above through the presence of the flange.

Figure 4A:
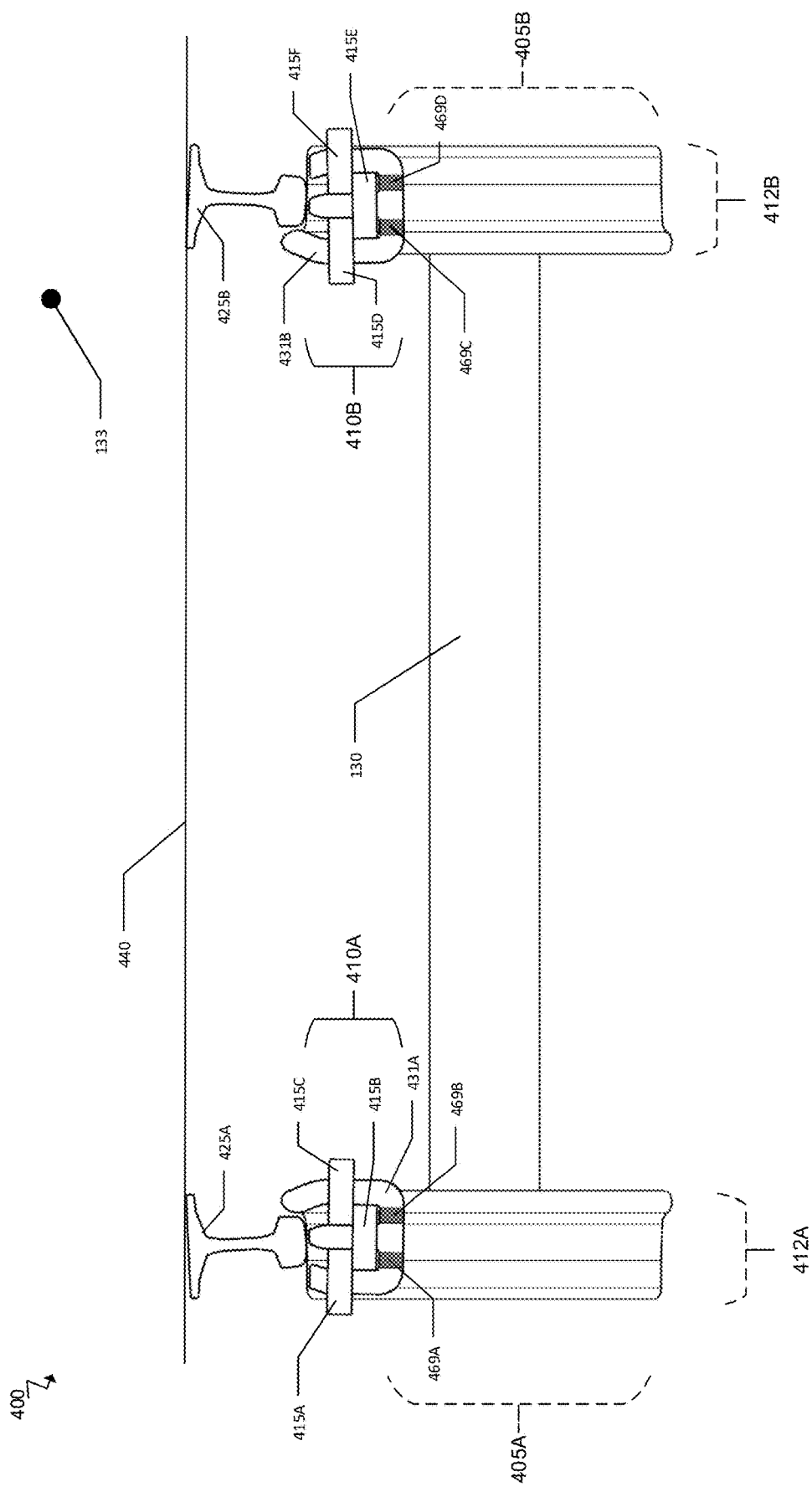
FIG. 4A illustrates a planar view of a wheeled bogie assembly, shown from a front perspective.

FIG. 4A illustrates a planar view of a wheeled bogie assembly 400, shown from a front perspective. The wheeled bogie assembly 400 comprises a first wheel assembly 405A operably connected by an axle 430 to a second wheel assembly 405B. The axle 430 is disposed between the wheel assemblies 405A, 405B. As shown in the instant figure, the wheeled bogie assembly 400 is traveling toward the viewer. The wheel assemblies 405A, 405B are oriented with radii substantially perpendicular to the axle 430. The wheel assembly 405A comprises a wheel 412A. Likewise, the wheel assembly 405B comprises a wheel 412B.

A first rail 425A and a second rail 425B are supported by a rail support surface 440. The rails 425A, 425B may be steel rails in one aspect. As shown, the rails 425A, 425B are mounted overhead. Such deployment may be common in cargo loading and unloading facilities, such as those proximate to shipping ports connecting ships to land routes. As shown, the rails 425A, 425B are flat-bottom rails which are commonly used in the United States. One of skill in the art will appreciate that other rail profiles may be utilized and be similarly operable for travel with the wheels 412A, 412B. One of skill in the art will appreciate that modern rail systems have a number of various ratios of incline similar to the instant ratios of incline that cause the railheads to point toward the wheeled bogie assembly 400.

A first electromagnetic engine 410A and a second electromagnetic engine 410B may be disposed in front of the wheel assemblies 405A, 405B, respectively. The electromagnetic engines 410A, 410B may however be similarly disposed behind the wheel assemblies 405A, 405B, depending on the perspective of the viewer. Further, a bogie typically has a plurality of wheelsets; therefore, the electromagnetic engines 410A, 410B may be distributed between several wheelsets (including before and after the wheelsets). For clarity, one wheelset is shown in the instant figure as comprised by the wheel assemblies 405A, 405B.

The electromagnetic engine 410A comprises a steel core 431A with three prongs. The steel core 431A has an outer electromagnetic coil 415A, a center electromagnetic coil 415B, and an inner electromagnetic coil 415C. The center prong of the steel core 431A separates the coils 415A, 415B, which are substantially aligned in parallel to the axle 430. The coil 415B is likewise disposed parallel to the axle 430. However, the coil 415B is disposed further away from the rail 425A than the coils 415A, 415C. Further, the coil 415B partially overlaps with the coils 415A, 415C. As shown in the instant figure, the overlap of the coil 415B is approximately one-third the width (or diameter) of the coil 415B as measured from the outer edge of the coil 415B. Likewise, the coil 415B is overlapping with the coil 415C by approximately one-third the width (or diameter) of the coil 415B. One of skill in the art will appreciate that the overlap may vary slightly without deviating from the intended purpose of the coils 415A, 415B, 415C.

An air gap exists between the steel core 431A and the rail 425A. Each prong of the steel core 431A maintains substantially the same distance from the rail 425A to prevent contact with the rail 425A while still maintaining proximity to the rail 425A for attractive magnetic force as generated by the coils 415A, 415B, 415C. Similarly, an air gap exists between the steel core 431B and the rail 425B. Each prong of the steel core 431B maintains substantially the same distance from the rail 425B to prevent contact with the rail 425B while still maintaining proximity to the rail 425B for attractive and/or repulsive magnetic force as generated by the coils 415A, 415B, 415C.

The innermost prongs of the steel cores 431A, 431B are substantially coplanar with the flanges of the wheel assemblies 405A, 405B. The coplanar design enables both the flange and the steel core 431A, 431B to travel through the same channels of rails (not shown) during locomotion. For example, the flange may ride between the rail 425A and another rail (not shown). Having both the coplanar design as well as the end of the prong closer to the rail enables not only magnetic force generation but allows for the electromagnetic engine 410A to freely move through any segment of track in which the flange can similarly move.

The electromagnetic engine 410A contains a first permanent magnet 469A and a second permanent magnet 469B. The magnets 469A, 469B are disposed on the ventral side of the steel core 431A, below the coils 415A, 415B, 415C and distal to the tips of the prongs of the steel core 431A. The magnets 469A, 469B are disposed in a substantially horizontal direction parallel to axle 130. The magnet 469A is disposed between the base of the outer prong and the base of the center prong, both of which are part of the steel core 431A. The magnet 469B is disposed between the base of the center prong and the base of the outer prong, both of which are part of the steel core 431A. In one aspect, the alignment of the magnets 469A, 469B is such that they are magnetized in opposing directions along the longitudinal axis of the axle 130.

The electromagnetic engine 410B contains a first permanent magnet 469C and a second permanent magnet 469D. The magnets 469C, 469D are disposed on the ventral side of the steel core 431B, below the coils 415D, 415E, 415F and distal to the tips of the prongs of the steel core 431B. The magnets 469C, 469D are disposed in a line substantially horizontal to the axle 430. The magnet 469C is disposed between the base of the center prong and the base of the inner prong, both of which are part of the steel core 431B. The magnet 469D is disposed between the base of the outer prong and the base of the center prong, both of which are part of the steel core 431B.

The magnets 469A, 469B, 469C, 469D are attracted to the steel rails 425A, 425B, respectively. The attraction enables the wheel assemblies 405A, 405B to operate in substantial contact with the rails 425A, 425B as though the wheel assemblies 405A, 405B were operating on a traditional, ground-oriented rail with the benefit of gravity for adhesion. Further, the magnetic force interaction of the magnets 469A, 469B, 469C, 469D and the electromagnetic forces generated by the coils 415A, 415B, 415C, 415D, 415E, 415F provide for enhanced traction with the rails 425A, 425B.

Figure 4B:
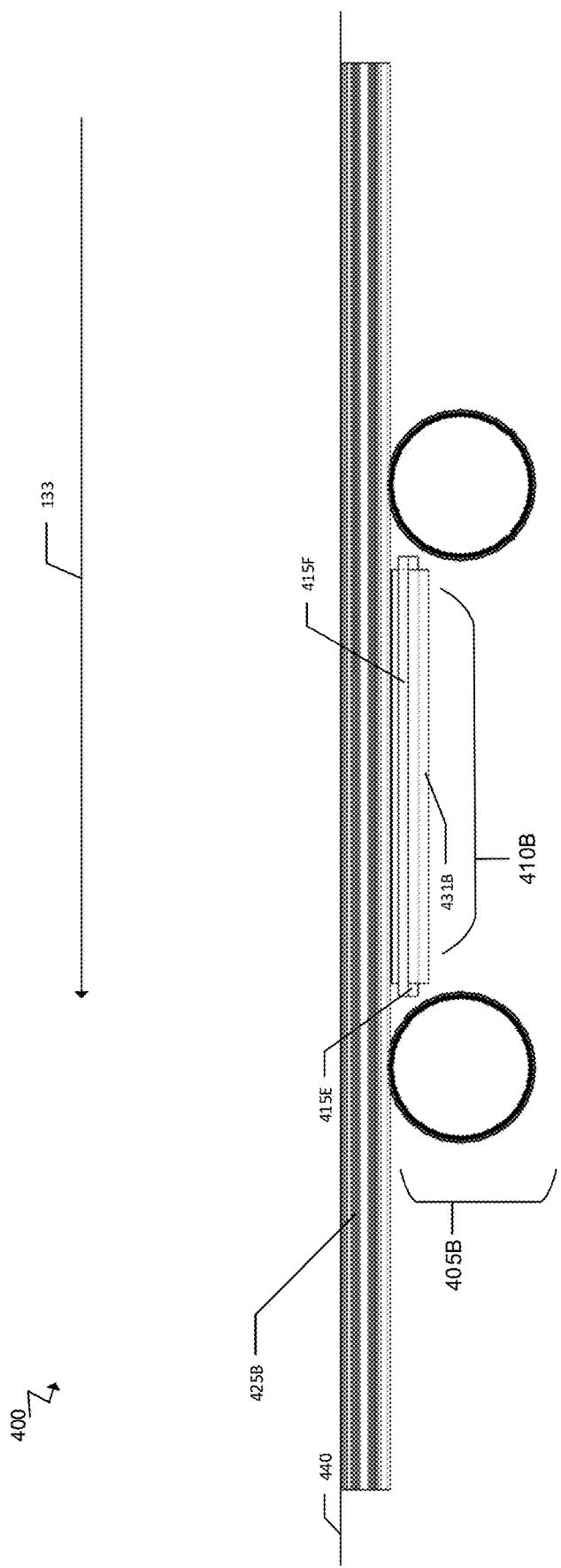
FIG. 4B illustrates a planar view of an electromagnetic engine, shown from a side perspective.

FIG. 4B illustrates a planar view of the electromagnetic engine 410B, shown from a side perspective. The direction of travel 133 is shown pointing to the left to show movement in that direction. As shown, the wheeled bogie assembly 400 is depicted with two separate wheel assemblies. One of skill in the art will appreciate the rightmost wheel is substantially similar to the wheel assembly 405B.

The electromagnetic engine 410B is depicted as being disposed along the rail 425B in parallel with the rail 425B. One of skill in the art will appreciate that having a longer or shorter electromagnetic engine 410B correspondingly increases or decreases the potential magnetic forces generated between the rail 425B and the electromagnetic engine 410B itself. In implementation, any number of obstacles may introduce the need for varying lengths of the electromagnetic engine 410B (e.g., braking systems, sensor modules, traditional guidance systems relying on additional wheels, etc.). One of skill in the art will appreciate the capability for the solution proposed herein to be implemented with any conceivable length to fit between or around existing and/or necessary systems which require contact with or proximity to the rail 425B.

Figure 4C:
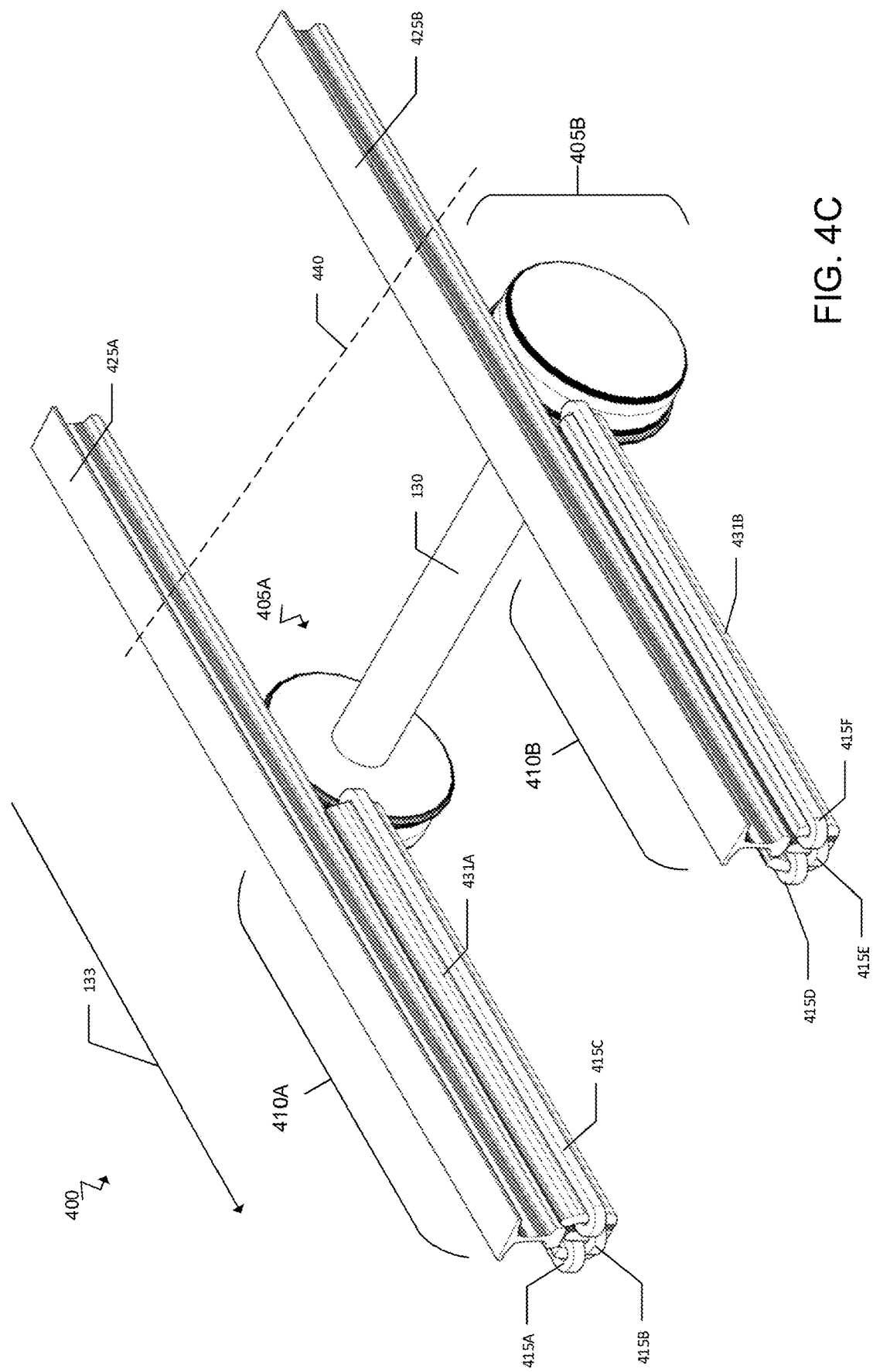
FIG. 4C illustrates a three-quarter perspective of a wheeled bogie assembly, as shown from a front perspective.

FIG. 4C illustrates a three-quarter perspective of the wheeled bogie assembly 400, as shown from a front perspective. One of skill in the art will appreciate that the steel cores 431A, 431B may be attached to the dorsal side of the bogie (not shown). Further, one of skill in the art will appreciate that the front wheel assemblies have been omitted from the instant figure for the purpose of clarity. The air gaps between the rails 425A, 425B and the steel cores 431A, 431B are clearly shown such that one of skill in the art will appreciate that substantially no portion of the steel cores 431A, 431B physically touch the rails 425A, 425B, respectively.

Figure 4D:
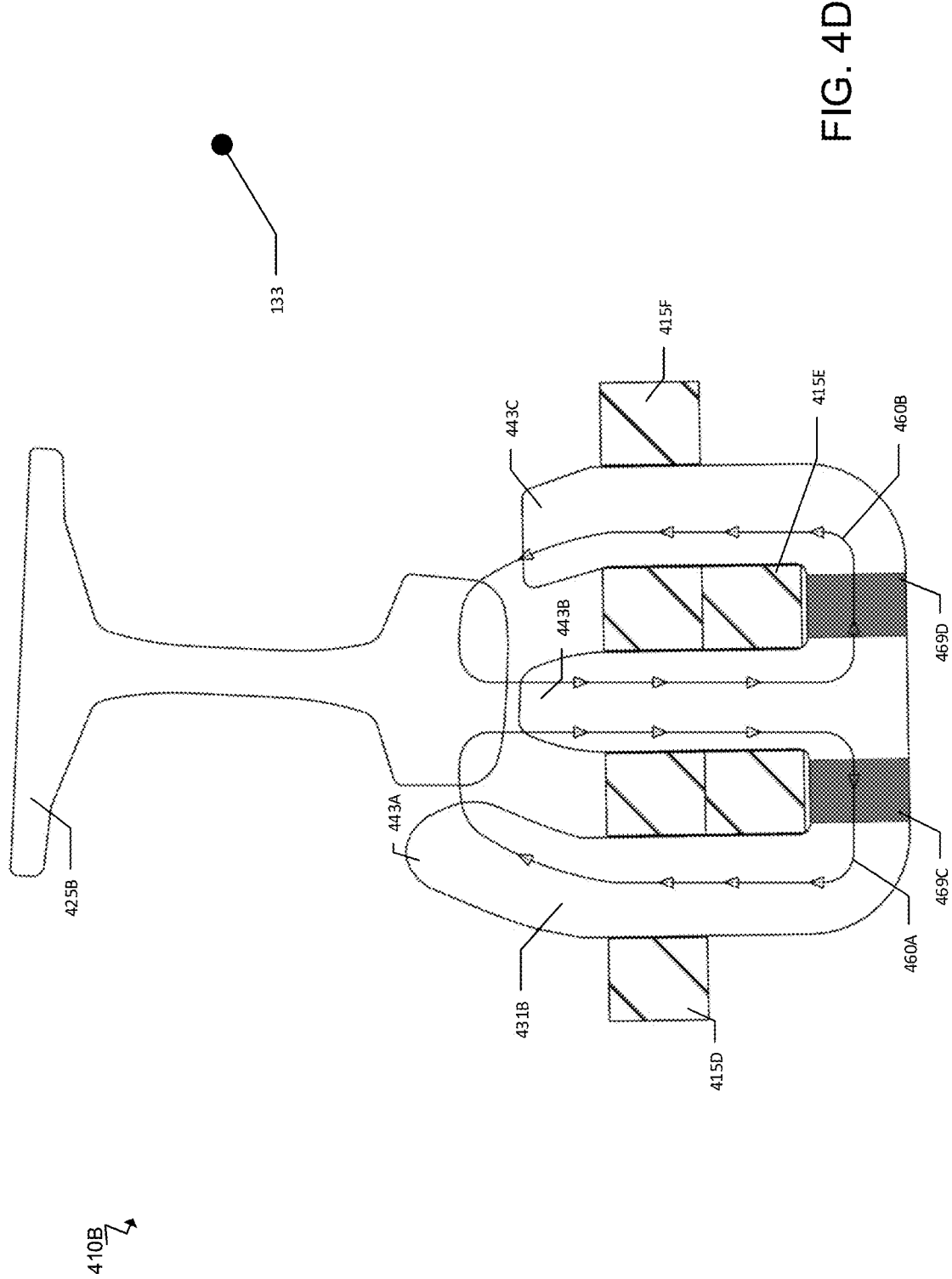
FIG. 4D illustrates a planar view of an electromagnetic engine, as shown from a front perspective.

FIG. 4D illustrates a planar view of the electromagnetic engine 410B, as shown from a front perspective. The steel core 431B comprises an inner prong 443A, a center prong 443B, and an outer prong 443C. As previous discussed, the coils 415D, 415E, 415F are disposed around the prongs 443A, 443B, 443C. The inner prong 443A curves slightly toward the rail 425B to increase inner attractive force 460A which is reacted by the rail 425B. The inner attractive force 460A is generated by the prongs 443A, 443B when the coils 415D, 415E are excited.

The outer prong 443C is curved toward the head of the rail 425B. Similar to the prong 443A, the orientation of the prong 443C enables an outer magnetic force 460B to travel through the prongs 443B, 443C. The outer magnetic force 460B is generated by the prongs 443B, 443C as created by the coils 415E, 415F.

The air gap between the steel cores 431A, 431B and the rails 425A, 425B is shown in the instant figure in more detail. One of skill in the art will appreciate the lack of physical contact between the rail 425B and the prongs 443A, 443B, 443C. One of skill in the art will appreciate from the instant figure that the magnetic forces 460A, 460B represent flux produced by excitation of the coils 415D, 415E, 415F. Hence the flux is understood to flow substantially in a loop comprising at least two of the prongs in the electromagnetic engine 410B. The flux may also flow in a plurality of other configurations not depicted in the instant figure that may comprise loops which directly connect between the prongs 443A, 443C. Further, the electromagnetic engine 410B may accomplish similar functionality in a configuration which may involve a greater number of prongs and coils. It may be further appreciated that the prongs 443A, 443B, 443C of the electromagnetic engines 410A, 410B are substantially similar in cross-section to the shape of the wheel assemblies 405A, 405B, such that the proximity of the electromagnetic engines 410A, 410B to the rails 425A, 425B is improved when the wheel assemblies 405A, 405B are in substantial contact with rails 425A, 425B.

Figure 4E:
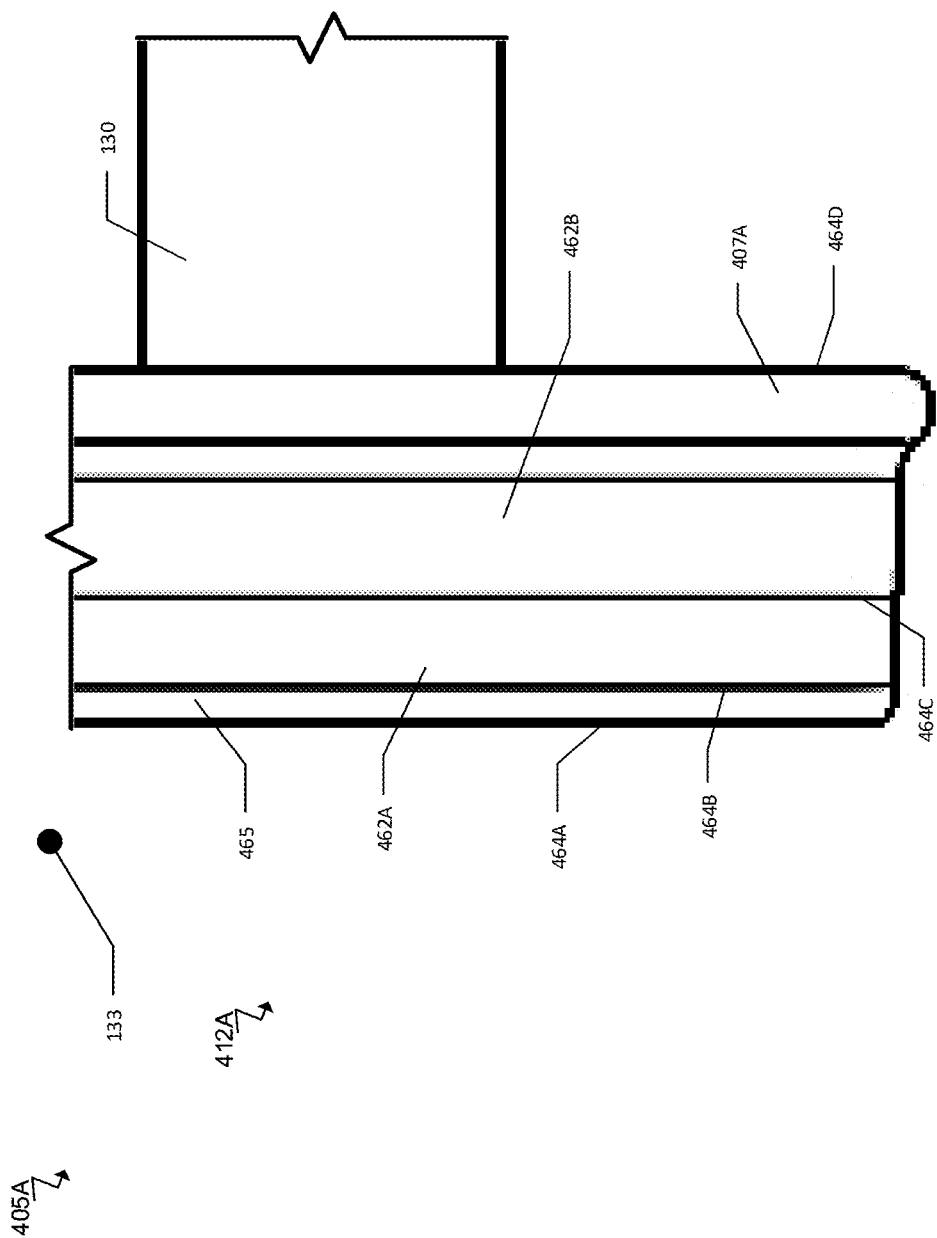
FIG. 4E illustrates a planar view of a wheel assembly, as shown from a front perspective.

FIG. 4E illustrates a planar view of the wheel assembly 405A, as shown from a front perspective. A wheel 412A has a flange 407A. The wheel 412A is formed with a cylindrical section 462A and a conical section 462B. The cylindrical section 462A is defined between a diameter 464B and a diameter 464C. The cylindrical section 462A is substantially flat between the diameters 464B, 464C. The cylindrical section 462A may have a shrinking diameter 465, that leads to an outer diameter 464A on the field side of the wheel 412A. The conical section 462B is positioned between the diameter 464C and a diameter 464D. One of skill in the art will appreciate that the wheel assemblies 405A, 405B are substantially similar with respect to the design disclosed in the instant figure.

Figure 5A:
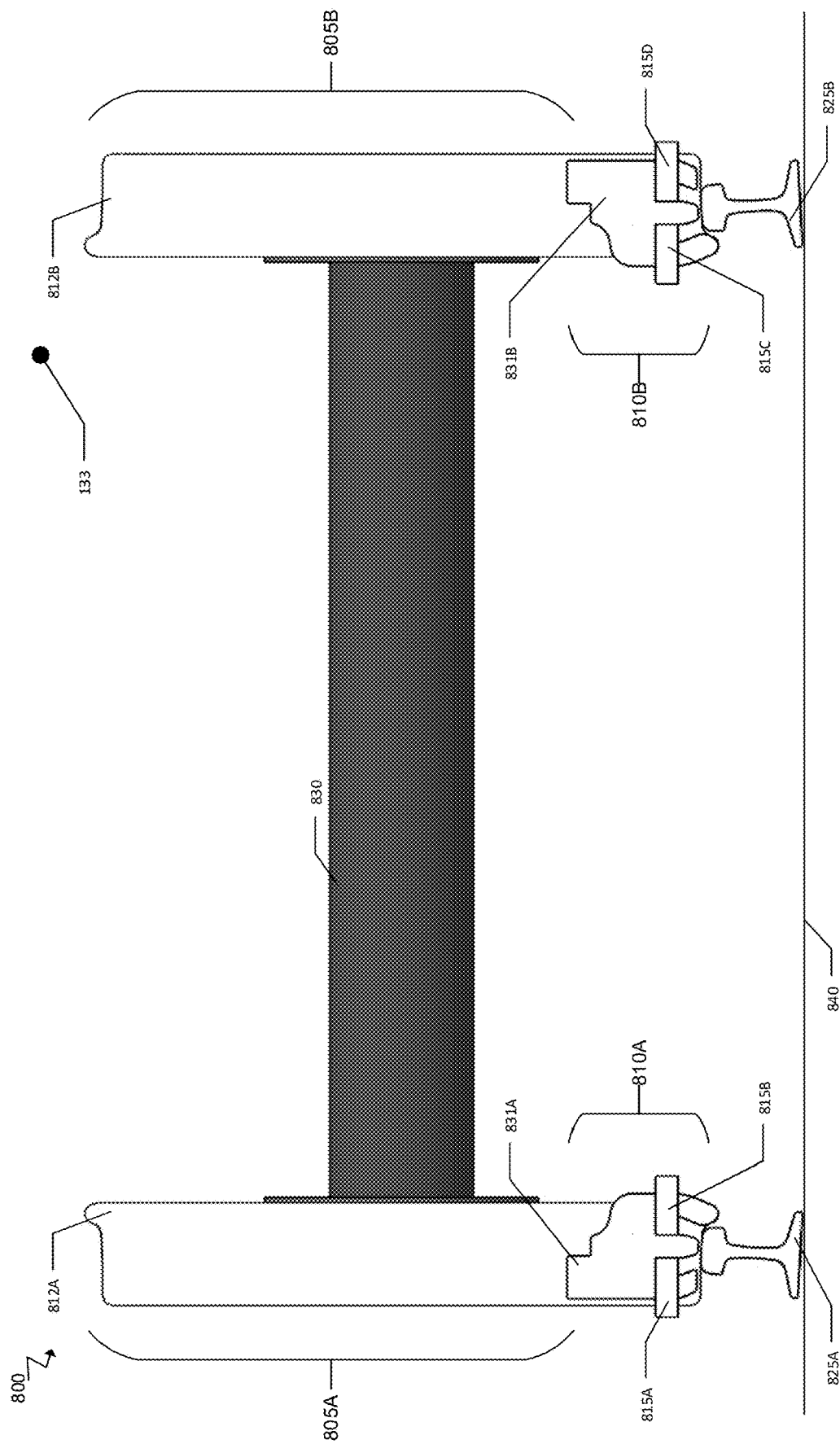
FIG. 5A illustrates a planar view of a wheeled bogie assembly, shown from a front perspective.

FIG. 5A illustrates a planar view of a wheeled bogie assembly 800, shown from a front perspective. The wheeled bogie assembly 800 comprises a first wheel assembly 805A operably connected by an axle 830 to a second wheel assembly 805B. The axle 830 is disposed between the wheel assemblies 805A, 805B. As shown in the instant figure, the wheeled bogie assembly 800 is traveling toward the viewer.

The wheel assembly 805A comprises a wheel 812A. Likewise, the wheel assembly 805B comprises a wheel 812B. The wheel 812A has a flange along the inner radius of the wheeled bogie assembly 800. The wheel 812B has a flange along the inner radius of the wheeled bogie assembly 800. The wheels 812A, 812B are semi-conical between the edge of the flange and the outer radius. In one aspect, the wheels 812A, 812B may have a substantially flat surface at or near the midpoint of the contact surface to the outer radius. One of skill in the art will appreciate that the inner radii of the wheels 812A, 812B are substantially larger than the outer radii of the wheels 812A, 812B as shown in the instant figure.

A first rail 825A and a second rail 825B are supported by a rail support surface 840. The rails 825A, 825B may be steel rails in one aspect. As shown, the rails 825A, 825B are flat-bottom rails which are commonly used in the United States. One of skill in the art will appreciate that other rail profiles may be utilized and be similarly operable for travel with the wheels 812A, 812B. The rails 825A, 825B are inclined toward the bogie assembly 800. One of skill in the art will appreciate that modern rail systems have a number of various ratios of incline similar to the instant ratios of incline shown in the instant figure.

A first electromagnetic engine 810A and a second electromagnetic engine 810B may be disposed in front of the wheel assemblies 805A, 805B, respectively. The electromagnetic engines 810A, 810B may however be similarly disposed in front of the wheel assemblies 805A, 805B, depending on the perspective of the viewer. Further, a bogie typically has a plurality of wheelsets; therefore, the electromagnetic engines 810A, 810B may distributed between several wheelsets. For clarity, one wheelset is shown in the instant figure as comprised by the wheel assemblies 805A, 805B.

The electromagnetic engine 810A comprises a steel core 831A with three prongs. The steel core 831A has an outer electromagnetic coil 815A and an inner electromagnetic coil 815B. The center prong of the steel core 831A separates the coils 815A, 815B. The coils 815A, 815B are designed to operate in a substantially similar manner as the coils 115A, 115B, 115C; however, the coils 815A, 815B may perform the same functionality while reducing the bill of materials required for the implementation of the electromagnetic engine 810A.

The electromagnetic engine 810B comprises a steel core 831B with three prongs. The steel core 831B has an inner electromagnetic coil 815C and an outer electromagnetic coil 815D. The coils 815C, 815D are designed to operate in a substantially similar manner as the coils 115D, 115E, 115F; however, the coils 815C, 815D may perform the same functionality while reducing the bill of materials required for the implementation of the electromagnetic engine 810B.

An air gap exists between the steel core 831A and the rail 825A. Each prong of the steel core 831A maintains substantially the same distance from the rail 825A to prevent contact with the rail 825A while still maintaining proximity to the rail 825A for attractive and/or repulsive magnetic force as generated by the coils 815A, 815B. Similarly, an air gap exists between the steel core 831B and the rail 825B. Each prong of the steel core 831B maintains substantially the same distance from the rail 825B to prevent contact with the rail 825B while still maintaining proximity to the rail 825B for bidirectional magnetic force as generated by the coils 815C, 815D.

Figure 5B:
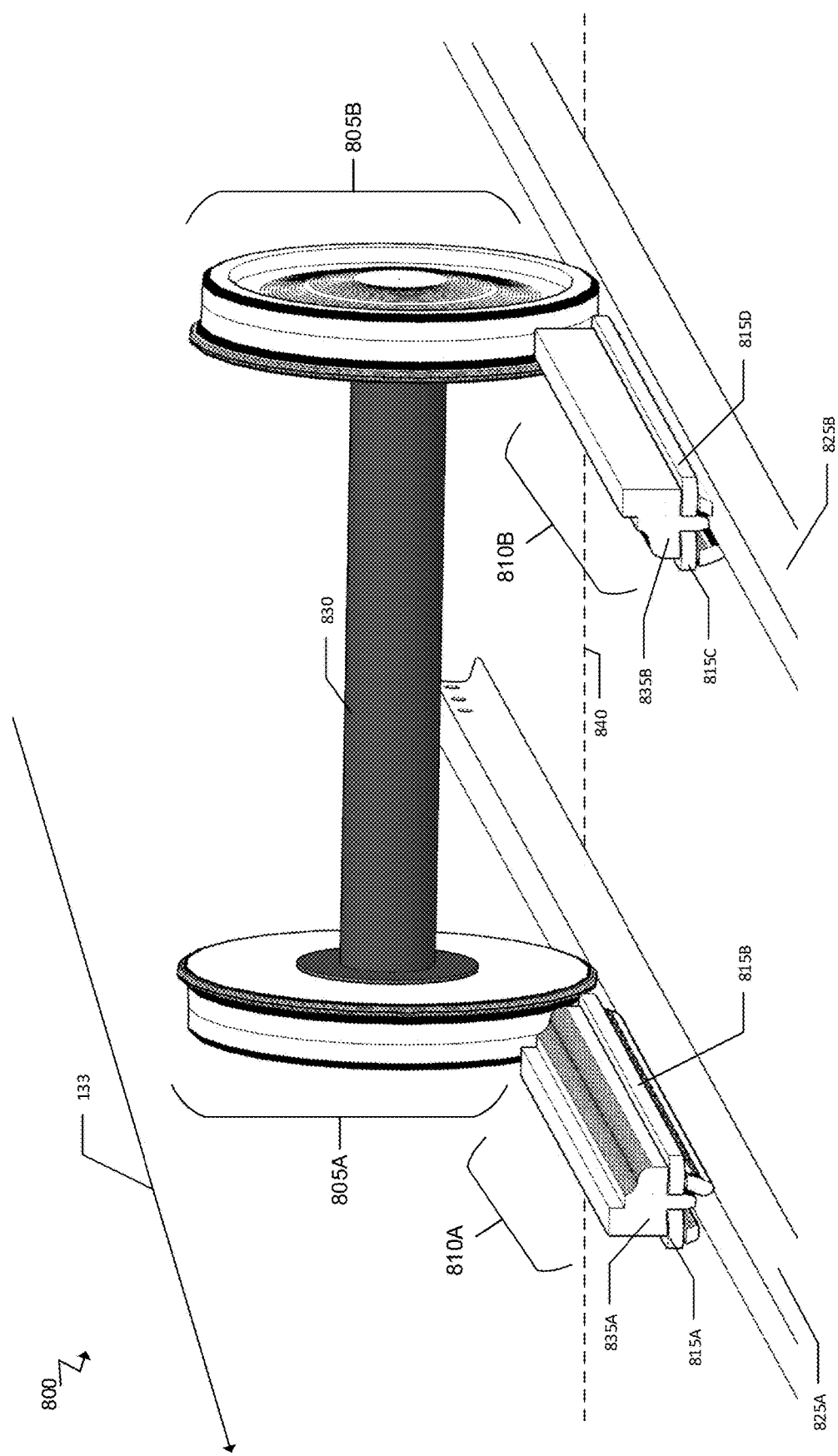
FIG. 5B illustrates a three-quarter perspective of a wheeled bogie assembly, as shown from a front perspective.

FIG. 5B illustrates a three-quarter perspective of the wheeled bogie assembly 800, as shown from a front perspective. One of skill in the art will appreciate that the steel cores 831A, 831B would be attached to the undercarriage of the bogie (not shown). The air gaps between the rails 825A, 825B and the electromagnetic engines 810A, 810B are clearly shown such that one of skill in the art will appreciate that substantially no portion of the steel cores 831A, 831B physically touches the rails 825A, 825B, respectively.

Figure 5C:
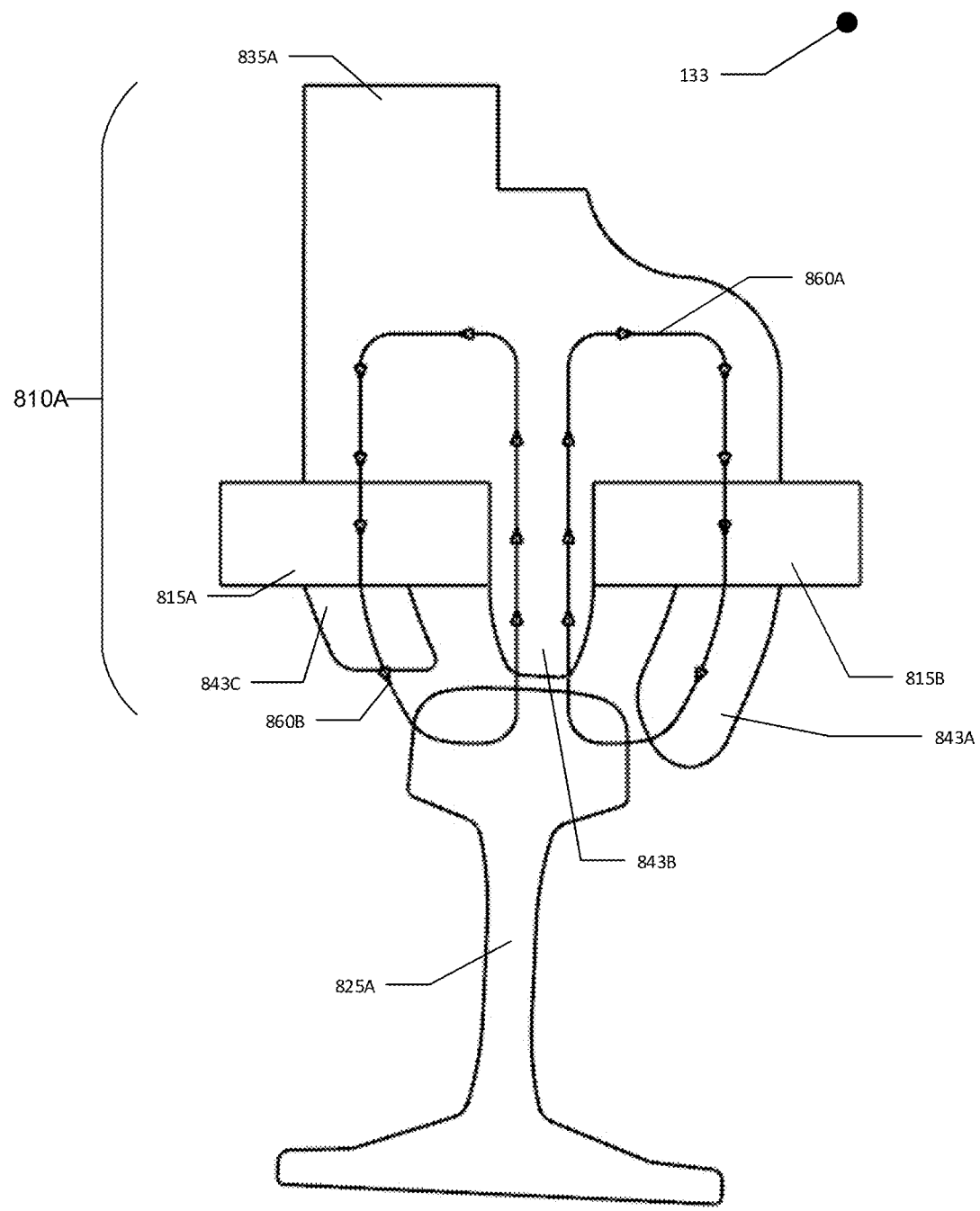
FIG. 5C illustrates a planar view of an electromagnetic engine, as shown from a front perspective.

FIG. 5C illustrates a planar view of the electromagnetic engine 810A, as shown from a front perspective. The steel core 831B comprises an inner prong 843A, a center prong 843B, and an outer prong 843C. As previous discussed, the coils 815A, 815B are disposed around the prongs 843A, 843B, 843C. An inner attractive force 860A travels through the rail 825A. The inner attractive force 860A is generated by the prongs 843A, 843B when the coils 815A, 815B are excited. An outer magnetic force 860B travels through the prongs 843B, 843C. The outer magnetic force 860B is generated by the prongs 843B, 843C as created by the coils 815A, 815B.

An air gap is shown in the instant figure in more detail. One of skill in the art will appreciate the lack of physical contact between the rail 825B and the prongs 843A, 843B, 843C. It may also be appreciated that the electromagnetic engine 810A is comprised of the prongs 843A, 843B, 843C, and that the prongs 843A, 843B, 843C are substantially of the same length, such that the airgap between the prongs 843A, 843B, 843C and the rail 825A occurs at approximately the same height in the vertical direction as depicted. Thus, the electromagnetic engine 810A may translate laterally with respect to the rail 825B without resulting in mechanical interference between the electromagnetic engine 810A and the rail 825A. The electromagnetic engine 810A may be understood to produce varying forces in each lateral position as the coils 815A, 815B are excited by an electric current.

Figure 6A:
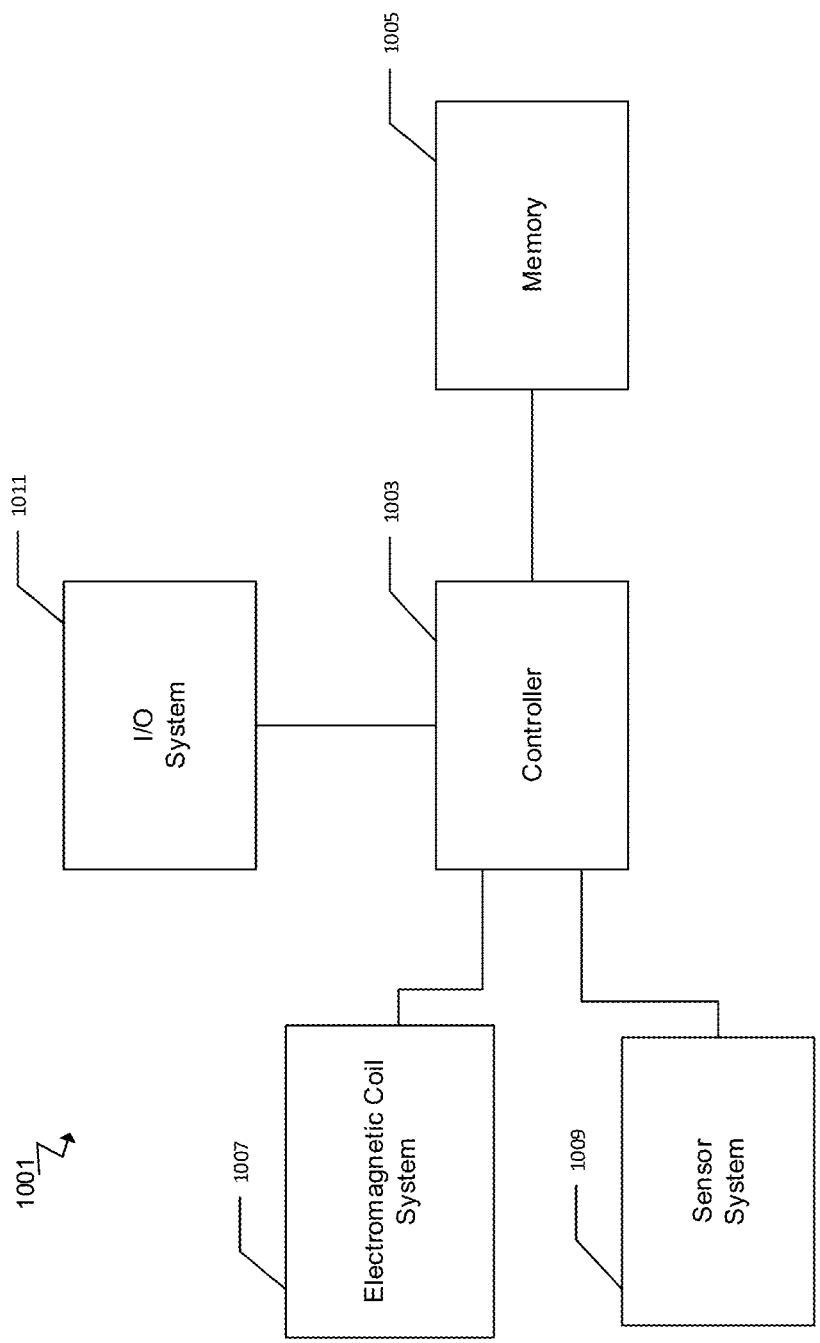
FIG. 6A is a block diagram of a system operable for use with electromagnetic engines.

FIG. 6A is a block diagram of a system 1001 operable for use with the electromagnetic engines described herein. For clarity, the electromagnetic engines 110A, 110B may be referenced frequently; however, one of skill in the art will appreciate how various electromagnetic engines may serve substantially similar purposes.

One of skill in the art will appreciate that the electromagnetic engine 110A may require a hardware and software solution, similar to the system 1001, in order to manage the operation of the electromagnetic engine 110A. The system 1001 may be configured to operate within the electromagnetic engine 110A, within the bogie assembly 100, on a server, in the cloud, or combination thereof. For example, a deployment within a deep tunnel may require stand-alone implementations where much of the logic within the system 1001 is resident on the bogie assembly 100. In contrast, a deployment on standard, above-ground rails may have an implementation of the system 1001 that utilizes remote processing since communication is accessible and reliable.

A controller 1003 may be operatively connected a memory 1005, an electromagnetic coil system 1007, a sensor system 1009, and an I/O system 1011. The controller 1003 may be implemented in hardware, software, or combination thereof. One of skill in the art will appreciate how an operating environment may affect selection of a controller. For example, one of skill in the art may implement the controller 1003 as an ASIC or as software running on a general-purpose computer (e.g., an x86 machine).

In one aspect, the controller 1003 may manage the coils 115A, 115B, 115C, 115D, 115E, 115F via the electromagnetic coil system 1007. For instance, the controller 1003 may so communicate with the electromagnetic coil system 1007 in order to ascertain the presence and location of the rail 125A. In another aspect, the controller 1003 may perform guidance control by exciting one or more of the coils 115A, 115B, 115C, 115D, 115E, 115F to increase traction, for braking, climbing, or combination thereof.

The sensor system 1009 may be operable for managing the sensors 120A, 120B, 120C, 120D, 120E, 120F. The sensor system 1009 may be configured to perform triangulation based on a number of observations. In one aspect, the controller 1003 may instruct the sensor system 1009 to gather observations from the sensor 120A and the sensor 120C in order to view a portion of the rail 125A from two discrete perspectives. In another aspect, the sensor system 1009 may be operable for detecting the grade or cant of the rails 125A, 125B.

The memory 1005 is operable to store instructions, data, information, etc. in either volatile or non-volatile storage. The processes described herein may be configured to be stored in the memory 1005, in one aspect. In another aspect, the processes described herein may be encoded into the controller 1003 (e.g., as an ASIC). One of skill in the art will appreciate that the memory 1005 may take many forms in a commercial implementation of the disclosed solution.

The I/O system 1011 is generally operable to communicate information within the system 1001 itself or to a remote system (e.g., cloud computing environments). In one aspect, the I/O system 1011 may be operable to gather GPS location data from cellular-based triangulation, satellite, or combination thereof. In another aspect, the I/O system 1011 may be a 5G modem operable to communicate wirelessly with the Internet.

The I/O system 1011 may be connected to other implementations of the system 1001 such that the system 1001 may be considered a node within a larger system of many implementations of the system 1001. For example, a first bogie assembly may communicate guidance data to a second bogie assembly via each I/O system 1011 of the bogie assemblies, respectively. Such communication may be over the Internet or via a local area network (e.g., ethernet, Bluetooth, WIFI, etc.). Further, such communication may be for additional information beyond guidance (e.g., safety, weather, traffic, passenger load, etc.).

The electromagnetic coil system 1007 is generally operable to manage the coils 115A, 115B, 115C, 115D, 115E, 115F. Further, the electromagnetic coil system 1007 may manage the parameters of the electromagnetic field (e.g., phase, power, etc.).

Figure 6B:
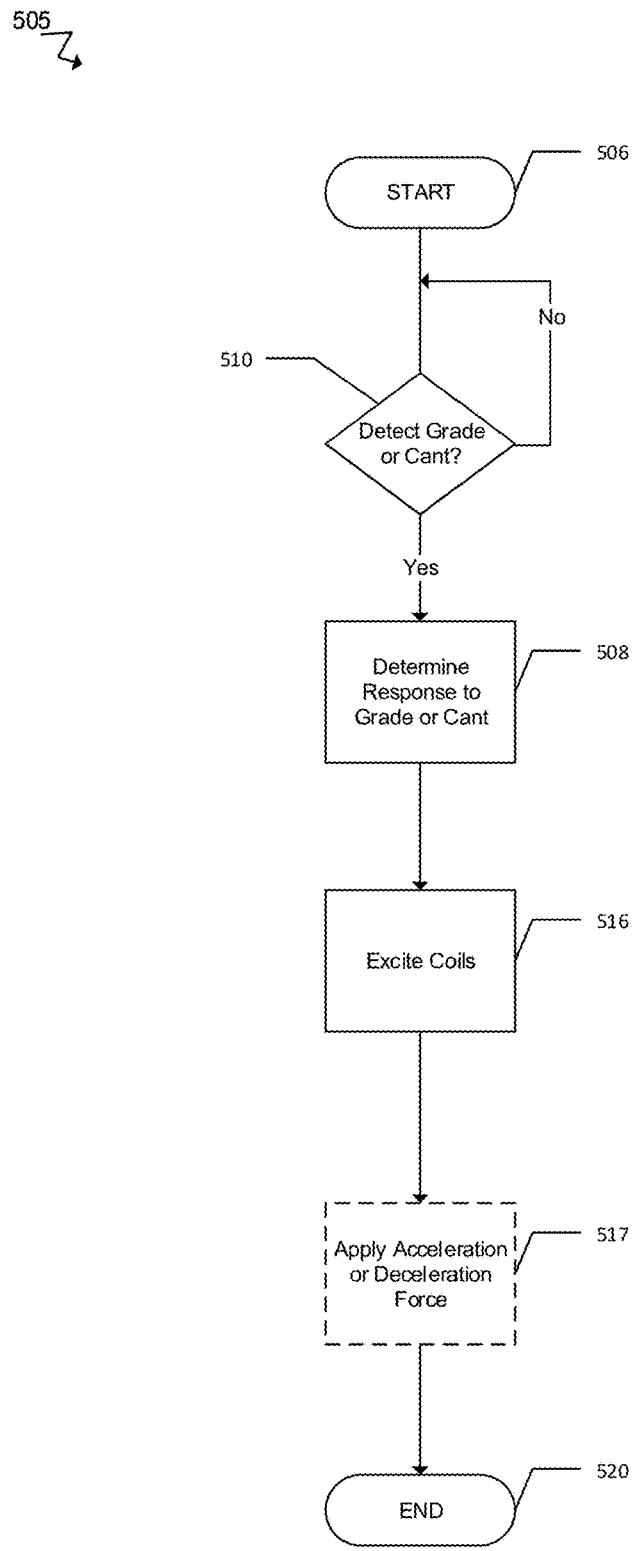
FIG. 6B illustrates a process for the operation of an electromagnetic engine.

FIG. 6B illustrates a process 505 for the operation of an electromagnetic engine (e.g., the electromagnetic engine 105A). In one aspect, the process 505 may execute within the system 1001 (e.g., within the controller 1003). The process 505 begins at the start block 506. The process 400 then proceeds to the decision block 510 where a decision is made whether the bogie is operating on a grade in the forward direction of travel and/or with a cant in a lateral vector to the direction of travel. In one aspect, the sensor system 1009 may be utilized to detect the grade or cant. If no grade or cant is detected, the process 500 proceeds along the NO branch. Returning to the decision block 510, if a determination is made that the bogie is traveling along a forward grade, the process 505 proceeds to the block 508.

At the block 508, a determination is made with respect to how many coils to engage. In one aspect, the controller 1003 may make the determination. Further, the controller 1003 may coordinate with the electromagnetic coil system 1007 in order to operate the coils 115A, 115B, 115C, 115D, 115E, 115F. The method 505 then proceeds to the block 516 at which point the process 505 excites the coils 115A, 115B, 115C, 115D, 115E, 115F in both the electromagnetic engines 110A, 110B thus providing additional traction. The process 505 then proceeds to the block 517 wherein a determination is made whether to apply acceleration and/or deceleration force. In one aspect, the additional traction may be utilized for increasing braking efficacy. In another aspect, the additional traction may be utilized for increasing drive traction (typically in uphill climbs). The method 505 then proceeds to the end block 520 and terminates.

Figure 6C:
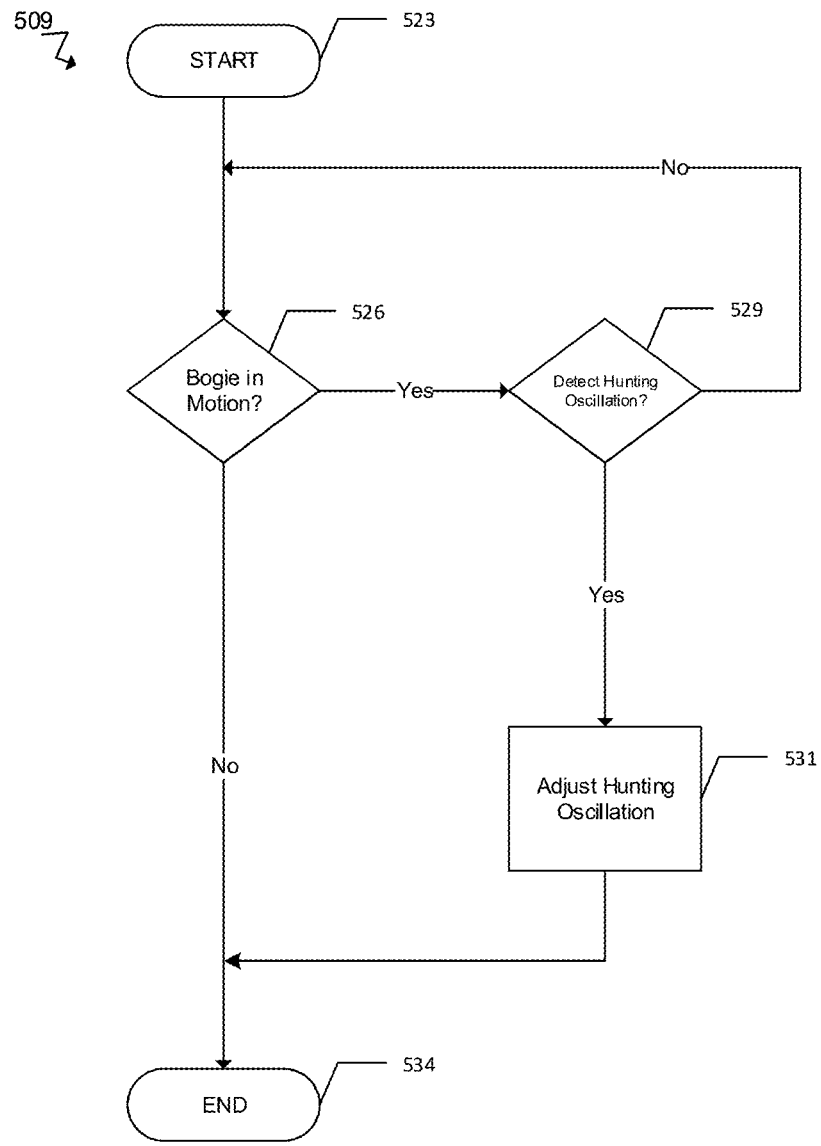
FIG. 6C illustrates a process for the operation of an electromagnetic engine.

FIG. 6C illustrates a process 509 for the operation of an electromagnetic engine. In one aspect, the system 1001 may be utilized for the execution of 509. Specifically, the controller 1003 and related system may execute the process 509. The process 509 begins at the start block 523 and proceeds to the decision block 526 wherein a determination is made to ascertain whether the bogie is in motion. In one aspect, the sensor system 1009 may be utilized to determine current velocity, acceleration, or a combination thereof. If the bogie is not in motion, the process 509 proceeds to the end block 534 along the NO branch, at which point the process 509 terminates. Returning to the decision block 526, if the bogie is in motion, the method 402 proceeds along the YES branch to the decision block 429. At the block 429, a determination is made whether an undesired level of hunting oscillation is occurring within the wheelsets of the bogie. If the hunting oscillation is either non-existent or within tolerance, the process 509 proceeds along the NO branch. Returning to the decision block 529, the process 509 proceeds along the YES branch if the hunting oscillation (sometimes simply referred to as lateral movement) has reached an undesired level.

At the block 531, a determination is made whether lateral forces may be utilized to reduce hunting oscillation. The controller 1003 may make said determination. In one aspect, the electromagnetic engines 110A, 110B may engage the coils 115A, 115B, 115C, 115D, 115E, 115F such that hunting oscillation is reduced by creating attractive or repulsive magnetic forces between the wheel assemblies 105A, 105B and the rails 125A, 125B, respectively. The electromagnetic coil system 1007 may be utilized to manage the power levels of the coils 115A, 115B, 115C, 115D, 115E, 115F. One of skill in the art will appreciate that varying levels of excitement among the coils 115A, 115B, 115C, 115D, 115E, 115F may be necessary to stabilize the oscillation. Likewise, an overcorrection may lead to an exaggeration of the oscillation. The process 509 then proceeds to the end block 534 and terminates.

FIG. 7A illustrates a planar view of the bogie assembly 100 operating on an inclined plane 673, as shown from a front perspective. As shown, the bogie assembly is moving toward from the viewer along the rails 125A, 125B. A cant 675 exists between the inclined plane 673 and the rail support 140. A center of mass 663 may have a lateral force 665 due to wind. Excessive velocity may cause a turnover event on the rail 125A because the excessive speed and cant 675 may cause overturn torque 667 given a centrifugal load 665 from a center of mass 663. Lift 669 may be thereby generated by overturn torque 667. To counteract the lift 669, the electromagnetic engine 110B may be engaged to cause the wheel assembly 105B to maintain traction with the rail 125B by an attractive magnetic force 671. In one aspect, the processes 505, 509, 511 may be utilized to engage multiple coils to provide traction across all wheel sets.

Figure 7B:
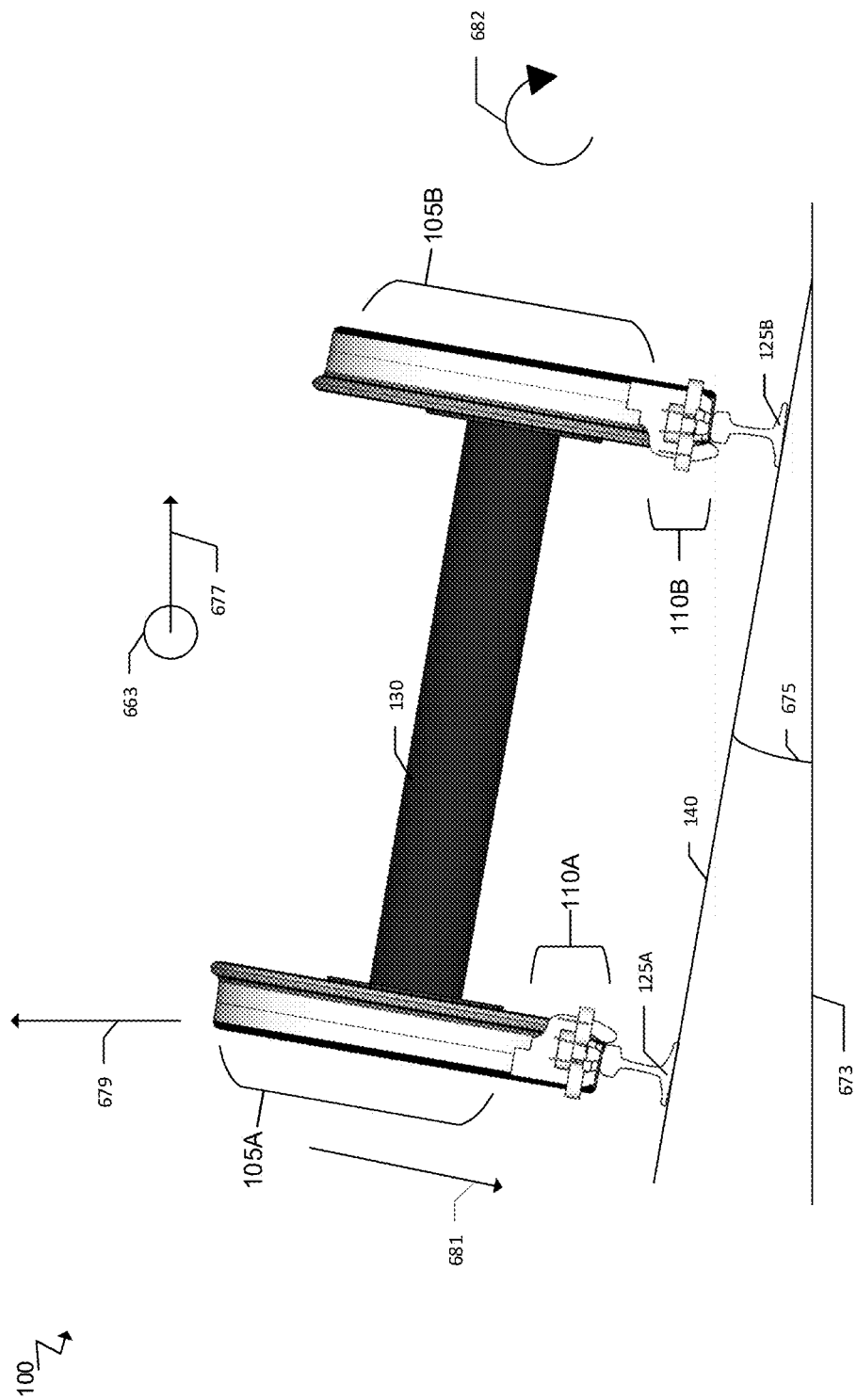
FIG. 7B illustrates a planar view of a bogie assembly operating on an inclined plane, as shown from a front perspective.

FIG. 7B illustrates a planar view of the bogie assembly 100 operating on an inclined plane, as shown from a front perspective. The center of mass 663 may have a lateral force 677 due to wind. A net torque 682 may be present over the rail 125B thus leading to turnover from the resulting lift 679 generated. To counteract the lift 679, the electromagnetic engine 110A may be engaged to generate attractive magnetic force 681. In one aspect, the processes 505, 509, 511 may be utilized to engage multiple coils to provide traction across multiple wheelsets.

Figure 7C:
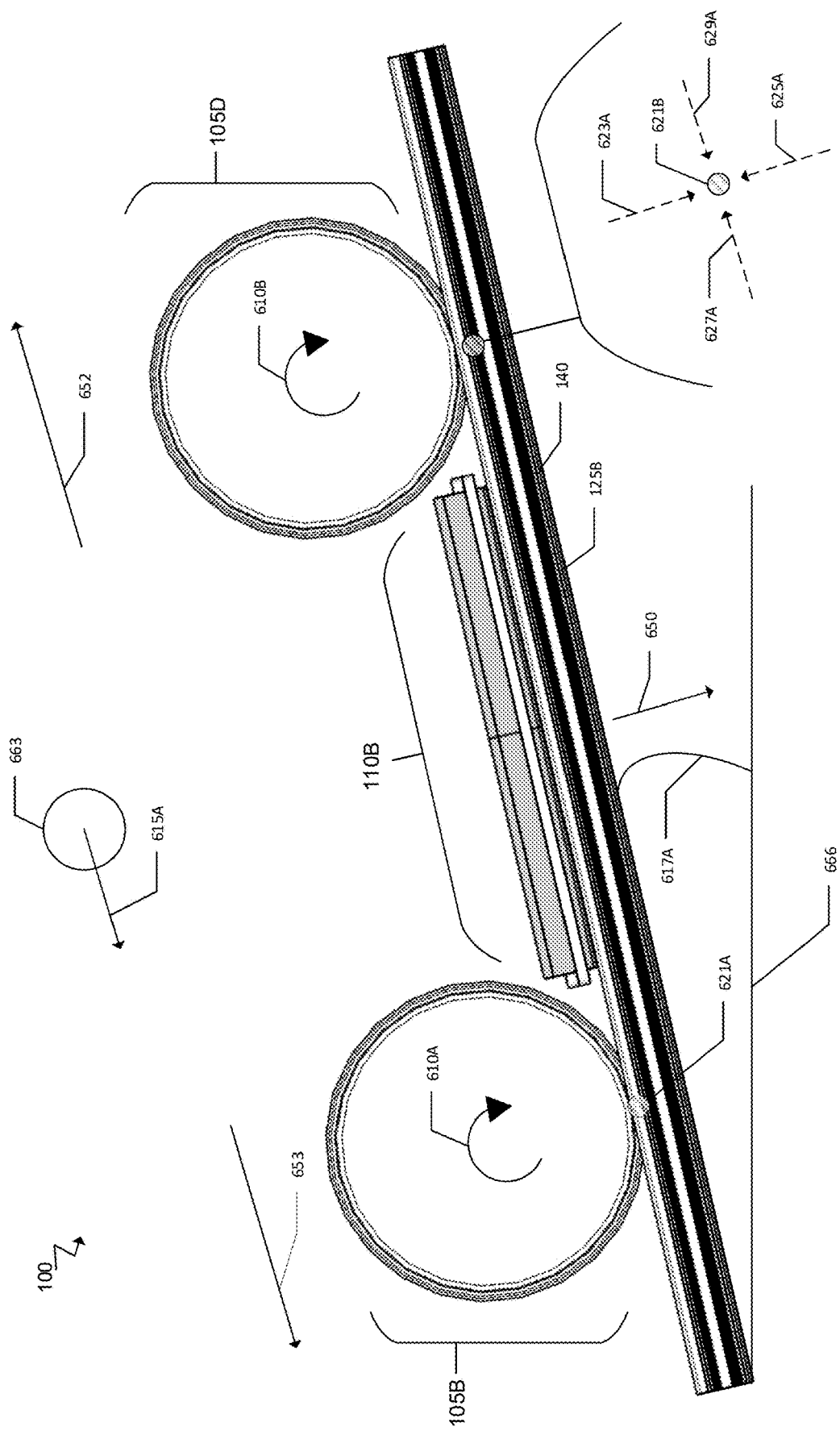
FIG. 7C illustrates a planar view of a bogie assembly operating on an inclined plane, as shown from a side perspective.

FIG. 7C illustrates a planar view of the bogie assembly 100 operating on an inclined plane 666, as shown from a side perspective. The bogie assembly 100 is traveling downhill along the direction of travel 615A based on the center of mass 663. The direction of travel is caused in part due to the downhill force 653 formed by gravitational and/or other applied loads and the angle of inclination 617A. Braking torque 610A, 610B operate to create uphill force 652 such that the bogie assembly reduces velocity as the bogie assembly moves along the rail 125B.

The electromagnetic engine 110B may be utilized to create a downward force 650. A wheel assembly 105D is shown and is substantially similar to the wheel assembly 105B discussed herein. The downward force 650 causes the wheel assemblies 105B, 105D to increase traction with the rail 125B.

A contact point 621A exists between the wheel assembly 105B and the rail 125B. Likewise, a contact point 621B exists between the wheel assembly 105D and the rail 125B. The electromagnetic engine 110B in operation creates a force interaction at the contact points 621A, 621B comprised of: a wheel load 623A, a track reaction force 625A, a traction force 627A, and a wheel slip force 629A. The electromagnetic engine 110B may increase or decrease the traction force 627A in accordance with the processes 505, 509, 511 discussed herein.

Figure 7D:
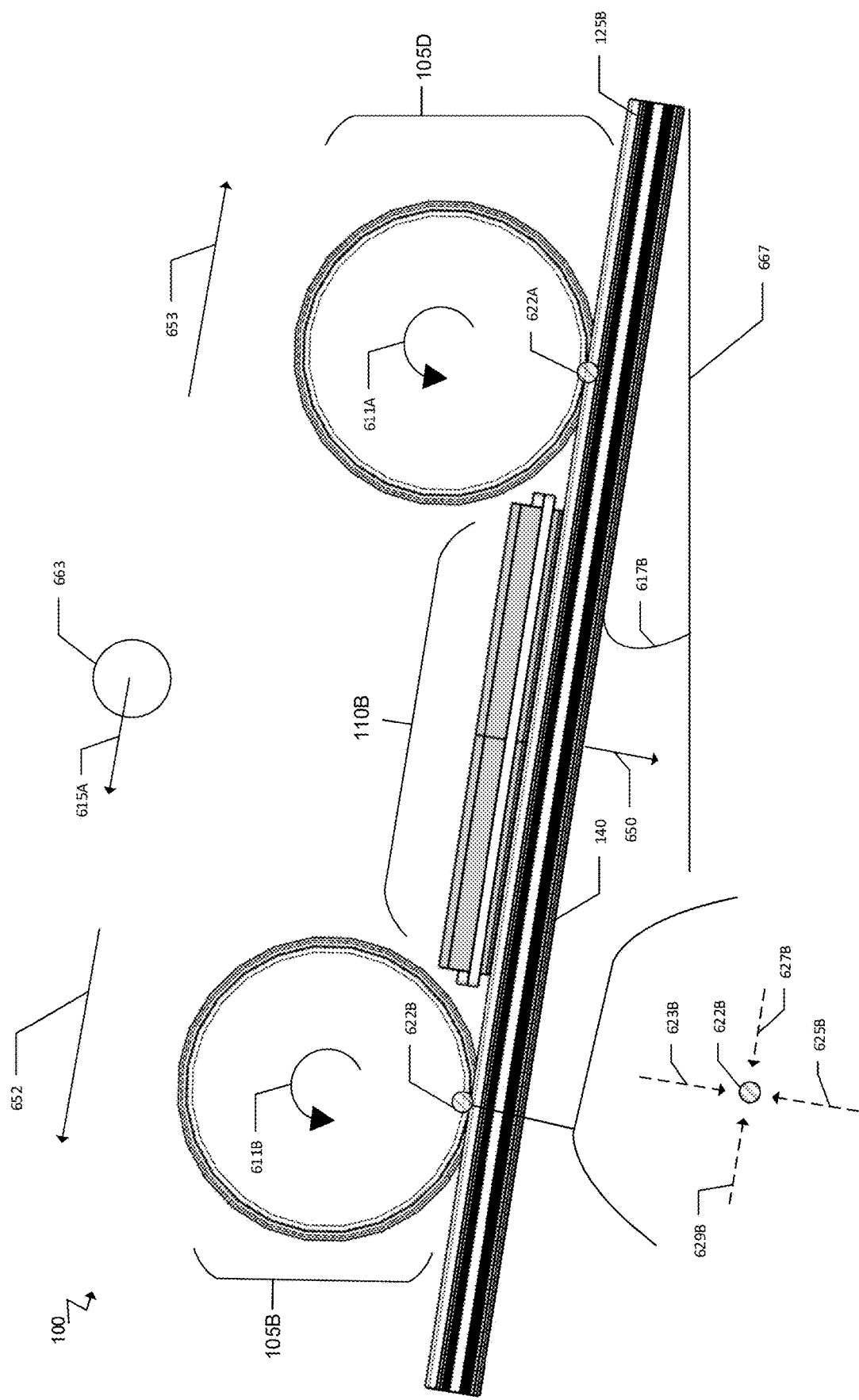
FIG. 7D illustrates a planar view of a bogie assembly operating on an inclined plane, as shown from a side perspective.

FIG. 7D illustrates a planar view of the bogie assembly 100 operating on an inclined plane 667, as shown from a side perspective. The bogie assembly 100 is moving in a direction of travel 615A based on the center of mass 663. A downhill force 653 is exerted on the bogie assembly 100 due to the inclined plane 667. An uphill force 652 is generated by driving torque 611A, 611B.

The electromagnetic engine 110B may create a downward force 650 by engaging the coils 115D, 115E, 115F such that the wheel assemblies 105A, 105B have more traction with the rail 125B. A contact point 622A exists between the wheel assembly 105D and the rail 125B. Similarly, a contact point 622B exists between the wheel assembly 105B and the rail 125B. The force interaction at the contact point 622B is comprised of: a wheel load force 623B, a track reaction force 625B, a traction force 627B, and a wheel slip force 629B. When the electromagnetic engine 110B is engaged, the wheel load force 623B is increased, and thus the traction force 627B may be increased, thus providing more efficient uphill climbing of the bogie assembly. One of skill in the art will appreciate that the electromagnetic engines 105A, 105B should be understood to produce lateral forces which result in guidance of the bogie, as well as attractive forces which result in elevated wheel contact loads and associated conical-wheel guidance loads when such wheels are present.

Figure 7E:
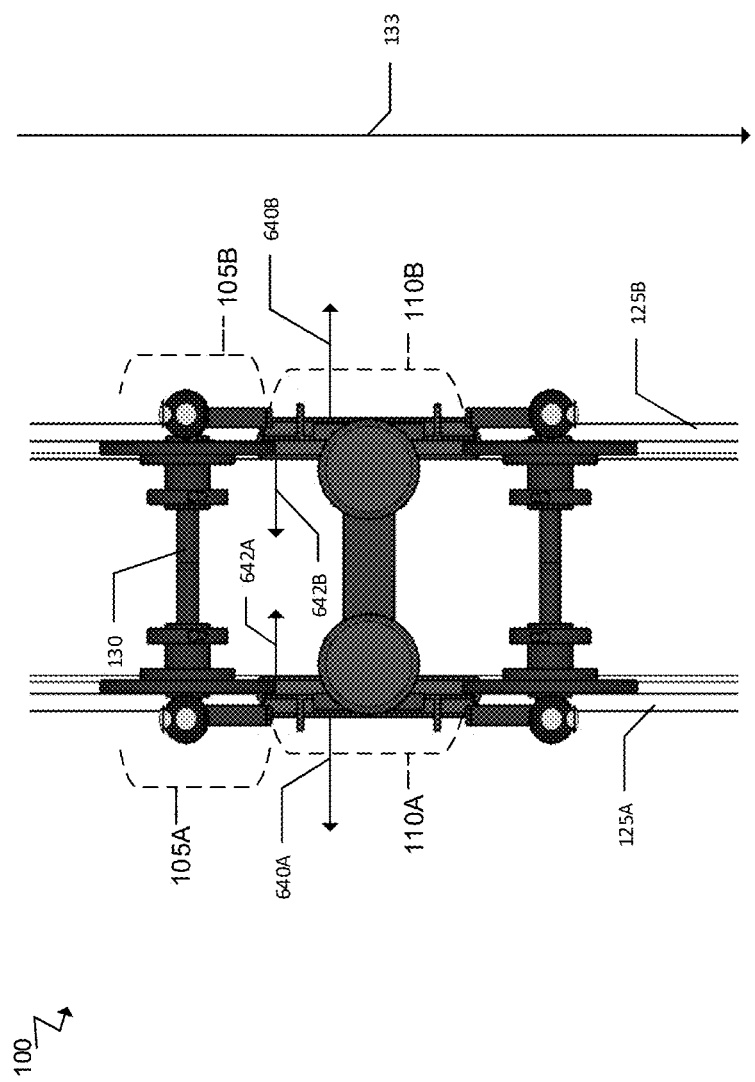
FIG. 7E illustrates a planar view of a bogie assembly, as shown from an overhead perspective.

FIG. 7E illustrates a planar view of the bogie assembly 100, as shown from an overhead perspective. Hunting oscillation may be reduced by use of the processes 505, 509, 511 described above viz. lateral forces 640A, 640B, 642A, 642B may operate in concert to stabilize the wheel assemblies 105A, 105B. As discussed above, traction force may be increased by operation of the electromagnetic engines 110A, 110B such that the wheel assemblies 105A, 105B have stronger contact with the rails 125A, 125B. The resulting electromagnetic guidance and/or contact forces may inhibit or completely eliminate noticeable hunting oscillation. One of skill in the art will appreciate how the reduction in hunting oscillation likewise decreases wear-and-tear of both components of bogie as well as the rail. Further, the processes 505, 509, 511 may be utilized to reduce or eliminate hunting oscillation.

Figure 8:
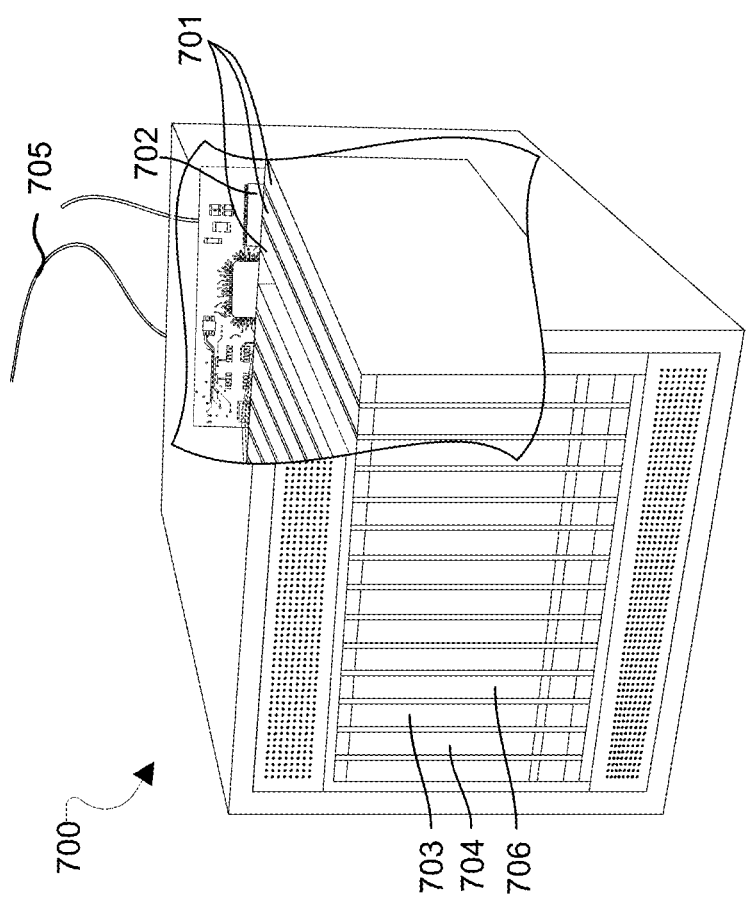
FIG. 8 is a block diagram illustrating an example server suitable for use with the various aspects described herein.

FIG. 8 is a diagram illustrating a server 700 suitable for use with the various aspects described herein. In one aspect, the server 700 may be connected to the electromagnetic engines 110A, 110B in order to measure, store, and process data collected by the sensors 120A, 120B, 120C, 120D, 120E, 120F. Further, the processes 505, 509, 511 may be stored and executed by the server 700.

The server 700 may include one or more processor assemblies 701 (e.g., an x86 processor) coupled to volatile memory 702 (e.g., DRAM) and a large capacity nonvolatile memory 704 (e.g., a magnetic disk drive, a flash disk drive, etc.). As illustrated in the instant figure, processor assemblies 701 may be added to the server 700 by inserting them into the racks of the assembly. The server 700 may also include an optical drive 706 coupled to the processor 701. The server 700 may also include a network access interface 703 (e.g., an ethernet card, WIFI card, etc.) coupled to the processor assemblies 701 for establishing network interface connections with a network 705. The network 705 may be a local area network, the Internet, the public switched telephone network, and/or a cellular data network (e.g., LTE, 5G, etc.).

One of skill in the art will appreciate that any of the components of the server 700 may be designed into an implementation of the electromagnetic engine 110A. For example, the electromagnetic engines 110A, 110B may be controlled by a processor embedded into the either one of the electromagnetic engines 110A, 110B. In one aspect, the system 1001 may be implemented on the server 700. In another aspect, the processor assemblies 701 may be utilized as the controller 1003. In yet another aspect, the processor assemblies 701 may a low-power ARM architecture chipset embedded into the bogie assembly 100, the electromagnetic engines 110A, 110B, or combination thereof. With cloud-computing and distributed processing, the processes 505, 509, 511 may be executed within the electromagnetic engines 110A, 110B or a remote server (similar to the server 700).

The preceding description of the disclosed aspects is provided to enable any person skilled in the art to make, implement, or use the claims. Various modifications to these aspects will be readily apparent to those skilled in the art, and the generic principles defined herein may be applied to other aspects without departing from the scope of the claims. Thus, the present disclosure is not intended to be limited to the aspects illustrated herein but is to be accorded the widest scope consistent with the claims disclosed herein.

The invention claimed is:

1. An electromagnetic engine coupled to a wheeled bogie configured to operate on a plurality of rails, the electromagnetic engine comprising:
   a steel core, the steel core having an outer prong, a center prong, and an inner prong, the outer prong having a first base, the center prong having a second base, the inner prong having a third base;
   an outer coil, the outer coil being disposed about the outer prong;
   an inner coil, the inner coil being disposed about the inner prong, the inner prong being longer than the center prong and further being configured to substantially align with a profile of a flange belonging to a wheel assembly coupled to the wheeled bogie;
   a center coil, the center coil being disposed about the center prong, the center coil further substantially overlapping the outer coil and the inner coil, the center coil further being disposed more proximal to the second base; and
   a controller configured to control the outer coil, the inner coil, or a combination thereof.

2. The electromagnetic engine of claim 1, the controller being further configured to:
   determine, based on a longitudinal grade of the plurality of rails, a loss of traction event, the loss of traction event being associated with loss of traction between the wheel assembly and the plurality of rails;
   determine, based on the loss of traction event, a first value of attractive magnetic force configured to mitigate the loss of traction event; and
   excite, based on the first value of attractive magnetic force, the inner coil, the center coil, and the outer coil to generate attractive magnetic force.

3. The electromagnetic engine of claim 2, wherein the longitudinal grade of the plurality of rails is positive with respect to a direction of travel.

4. The electromagnetic engine of claim 1, the controller being further configured to:
   detect a generated lift event based on a cant of the plurality of rails and a current velocity of the wheeled bogie;
   determine a third value of attractive magnetic force configured to mitigate the generated lift event; and
   excite, based on the third value of attractive magnetic force, the inner coil, the center coil, and the outer coil to generate attractive magnetic force.

5. The electromagnetic engine of claim 4, wherein the plurality of rails form a turn having an inner rail and an outer rail, the generated lift event being associated with loss in contact between the wheel assembly and the inner rail.

6. The electromagnetic engine of claim 1, wherein the outer coil, the center coil, and the inner coil are disposed above a ferromagnetic surface formed by the plurality of rails and a plurality of rail extensions, the plurality of rail extensions being coupled to the plurality of rails.

7. The electromagnetic engine of claim 1, the electromagnetic engine further comprising:
   a first permanent magnet being disposed between the first base and the second base; and
   a second permanent magnet being disposed between the second base and the third base.

8. The electromagnetic engine of claim 1, the controller being further configured to:
   detect a lateral movement event of the wheeled bogie, the lateral movement event being associated with hunting oscillation occurring at the wheeled bogie;
   determine, based on the lateral movement event, a second value of attractive magnetic force configured to reduce hunting oscillation at the wheeled bogie; and
   excite, based on the second value of attractive magnetic force, the inner coil, the center coil, and the outer coil to generate attractive magnetic force.

9. The electromagnetic of claim 1, wherein the plurality of rails is disposed above the wheeled bogie.

10. A method for operation of an electromagnetic engine coupled to a wheeled bogie configured to operate on a plurality of rails, the method comprising:
   detecting, at a processor, based on a longitudinal grade of the plurality of rails, a loss of traction event, the loss of traction event being associated with loss of traction between a wheel assembly and the plurality of rails, the wheel assembly being coupled to the wheeled bogie;
   determining, at the processor, based on the loss of traction event, a first value of attractive magnetic force configured to mitigate the loss of traction event;
   exciting, based on the first value of attractive magnetic force, a plurality of coils to generate attractive magnetic force with respect to the plurality of rails;
   detecting, at the processor, a lateral movement event of the wheeled bogie, the lateral movement event being associated with hunting oscillation occurring at the wheeled bogie; and determining, at the processor, based on the lateral movement event, a second value of attractive magnetic force configured to reduce hunting oscillation at the wheeled bogie; and exciting, based on the second value of attractive magnetic force, the plurality of coils to generate attractive magnetic force.

11. The method of claim 10, wherein the longitudinal grade of the plurality of rails is positive with respect to a direction of travel.

12. The method of claim 10, wherein the plurality of rails is disposed above the wheeled bogie.

13. A method for operation of an electromagnetic engine coupled to a wheeled bogie configured to operate on a plurality of rails, the method comprising:
- detecting, at a processor, based on a longitudinal grade of the plurality of rails, a loss of traction event, the loss of traction event being associated with loss of traction between a wheel assembly and the plurality of rails, the wheel assembly being coupled to the wheeled bogie;
- determining, at the processor, based on the loss of traction event, a first value of attractive magnetic force configured to mitigate the loss of traction event;
- exciting, based on the first value of attractive magnetic force, a plurality of coils to generate attractive magnetic force with respect to the plurality of rails;
- detecting, at the processor, a generated lift event based on a cant of the plurality of rails and a velocity of the wheeled bogie;
- determining, at the processor, a third value of attractive magnetic force configured to mitigate the generated lift event; and
- excite, based on the third value of attractive magnetic force, the plurality of coils to generate attractive magnetic force with respect to the plurality of rails.

14. The method of claim 13, wherein the plurality of rails form a turn having an inner rail and an outer rail, the generated lift event being associated with loss in contact between the wheel assembly and the inner rail.

15. A computer-readable medium storing instructions that, when executed by a computer, cause the computer to:
- detect, at a processor, based on a longitudinal grade of a plurality of rails, a loss of traction event, the loss of traction event being associated with loss of traction between a wheel assembly and the plurality of rails, the wheel assembly being coupled to a wheeled bogie configured to operate on the plurality of rails;
- determine, at the processor, based on the loss of traction event, a first value of attractive magnetic force configured to mitigate the loss of traction event;
- excite, based on the first value of attractive magnetic force, a plurality of coils to generate attractive magnetic force with respect to the plurality of rails, the plurality of coils being coupled to an electromagnetic engine coupled to the wheeled bogie;
- detect, at the processor, a lateral movement event of the wheeled bogie, the lateral movement event being associated with hunting oscillation occurring at the wheeled bogie;
- determine, at the processor, based on the lateral movement event, a second value of attractive magnetic force configured to reduce hunting oscillation at the wheeled bogie; and
- excite, based on the second value of attractive magnetic force, the plurality of coils to generate attractive magnetic force with respect to the plurality of rails.

16. The computer-readable medium of claim 15, wherein the longitudinal grade of the plurality of rails is positive with respect to a direction of travel.

17. A computer-readable medium storing instructions that, when executed by a computer, cause the computer to:
- detect, at a processor, based on a longitudinal grade of a plurality of rails, a loss of traction event, the loss of traction event being associated with loss of traction between a wheel assembly and the plurality of rails, the wheel assembly being coupled to a wheeled bogie configured to operate on the plurality of rails;
- determine, at the processor, based on the loss of traction event, a first value of attractive magnetic force configured to mitigate the loss of traction event;
- excite, based on the first value of attractive magnetic force, a plurality of coils to generate attractive magnetic force with respect to the plurality of rails, the plurality of coils being coupled to an electromagnetic engine coupled to the wheeled bogie;
- detect, at the processor, a generated lift event based on a cant of the plurality of rails and a current velocity of the wheeled bogie;
- determine, at the processor, a third value of attractive magnetic force configured to mitigate the generated lift event; and
- excite, based on the third value of attractive magnetic force, the plurality of coils to generate attractive magnetic force with respect to the plurality of rails.

18. The computer-readable medium of claim 17, wherein the plurality of rails form a turn having an inner rail and an outer rail, the generated lift event being associated with loss in contact between the wheel assembly and the inner rail.

* * * * *